US008825002B2

(12) United States Patent
Meyer et al.

(10) Patent No.: US 8,825,002 B2
(45) Date of Patent: Sep. 2, 2014

(54) FRACTIONAL APPLICATIONS PRODUCT CATALOG

(71) Applicant: Macheen, Inc., Austin, TX (US)

(72) Inventors: Justin B. Meyer, Austin, TX (US);
Glenda J. Akers, Austin, TX (US);
Richard L. Schwartz, Austin, TX (US);
James Cesar Alfred Trotter, Frisco, TX (US); Catherine T. Callen, Austin, TX (US)

(73) Assignee: Macheen, Inc., Austin, TX (US)

( * ) Notice: Subject to any disclaimer, the term of this patent is extended or adjusted under 35 U.S.C. 154(b) by 71 days.

(21) Appl. No.: 13/690,834

(22) Filed: Nov. 30, 2012

(65) Prior Publication Data

US 2013/0336235 A1    Dec. 19, 2013

Related U.S. Application Data

(63) Continuation-in-part of application No. 13/369,055, filed on Feb. 8, 2012, now Pat. No. 8,594,618.

(60) Provisional application No. 61/440,471, filed on Feb. 8, 2011, provisional application No. 61/563,234, filed on Nov. 23, 2011.

(51) Int. Cl.
| | |
|---|---|
| *H04M 11/00* | (2006.01) |
| *H04W 48/00* | (2009.01) |
| *H04M 15/00* | (2006.01) |
| *H04L 12/14* | (2006.01) |
| *H04M 1/725* | (2006.01) |
| *H04L 12/24* | (2006.01) |
| *G06Q 20/14* | (2012.01) |
| *H04W 4/24* | (2009.01) |
| *H04W 4/00* | (2009.01) |
| *H04W 72/04* | (2009.01) |
| *H04W 48/02* | (2009.01) |

(52) U.S. Cl.
CPC ............... *H04W 4/24* (2013.01); *H04W 48/00* (2013.01); *H04M 15/8016* (2013.01); *H04L 12/1403* (2013.01); *H04L 12/1485* (2013.01); *H04M 1/72519* (2013.01); *H04M 15/52* (2013.01); *H04L 12/1442* (2013.01); *H04M 15/70* (2013.01); *H04M 1/72561* (2013.01); *H04L 41/5061* (2013.01); *G06Q 20/145* (2013.01); *H04M 15/43* (2013.01); *H04M 15/8022* (2013.01); *H04L 12/1432* (2013.01); *H04M 15/41* (2013.01); *H04W 48/02* (2013.01); *H04M 15/58* (2013.01); *H04W 4/003* (2013.01); *H04M 15/80* (2013.01); *H04W 72/04* (2013.01); *H04M 15/51* (2013.01)
USPC ........................................................ 455/405

(58) Field of Classification Search
USPC .......... 379/114.2, 114.16; 455/406, 558, 405, 455/414.1; 370/311, 329, 254, 259
See application file for complete search history.

(56) References Cited

U.S. PATENT DOCUMENTS

| | | | |
|---|---|---|---|
| 5,953,398 A | 9/1999 | Hill | |
| 5,960,416 A | 9/1999 | Block | |
| 6,041,411 A * | 3/2000 | Wyatt | .............................. 726/29 |
| 6,058,300 A | 5/2000 | Hanson | |
| 6,188,752 B1 | 2/2001 | Lesley | |
| 6,694,000 B2 | 2/2004 | Ung et al. | |
| 6,907,116 B2 | 6/2005 | Ung et al. | |
| 6,965,667 B2 | 11/2005 | Trabandt et al. | |
| 7,502,454 B2 | 3/2009 | Trabandt et al. | |
| 8,566,724 B2 * | 10/2013 | Nair et al. | ...................... 715/733 |
| 2008/0060069 A1 | 3/2008 | Vindici | |
| 2009/0286531 A1* | 11/2009 | Bhatt et al. | .................. 455/426.1 |
| 2011/0087757 A1* | 4/2011 | Paalanen et al. | .............. 709/219 |

OTHER PUBLICATIONS

"Nobill MVNO—the platform of choice"; Symsoft; Feb. 4, 2010; 12 pages.
Access Point Name; Wikipedia; http://en.wikipedia.org/wiki/Access_Point_Name; Jan. 27, 2011; 3 pages.

* cited by examiner

*Primary Examiner* — Kiet Doan
(74) *Attorney, Agent, or Firm* — John A. Fortkort; Fortkort & Houston P.C.

(57) ABSTRACT

A method is provided for controlling access to applications available on a second network by a plurality of client mobile communications devices on a first network, wherein the first network includes (a) a first database comprising (i) a product catalog which contains a listing of a subset of the applications available on the second network, and (ii) a set of service rules which governs access to any of the applications in the product catalog by the client mobile communications devices, (b) a second database which specifies the applications that have been activated for each of the plurality of client mobile communications devices, and (c) a network appliance which is in communication with the second database and which grants access by each of the client mobile communications devices to the respective applications specified as active for that device.

36 Claims, 18 Drawing Sheets

ACCOUNT MANAGEMENT VIEW

FRACTIONAL APPLICATIONS PRODUCT CATALOG

CROSS-REFERENCE TO RELATED APPLICATIONS

This application is a continuation-in-part application and claims the benefit of U.S. Ser. No. 13/369,055 (Meyer et al.), filed on Feb. 8, 2012, and entitled "SYSTEM AND METHOD FOR TASK SPECIFIC, METERED BANDWIDTH CONTROL WITHIN SHARED CLIENT ENVIRONMENT ON MOBILE COMMUNICATIONS PLATFORMS", which is incorporated herein by reference in its entirety, which claims the benefit of U.S. Provisional Application Ser. No. 61/440,471 (Meyer et al.), filed on Feb. 8, 2011, and entitled "SYSTEM AND METHOD FOR TASK SPECIFIC, METERED BANDWIDTH CONTROL WITHIN SHARED CLIENT ENVIRONMENT ON MOBILE COMMUNICATIONS PLATFORMS", which is also incorporated herein by reference in its entirety, and which also claims the benefit of U.S. Provisional Application Ser. No. 61/563,234 (Meyer et al.), filed on Nov. 23, 2011, and entitled "SYSTEM AND METHOD FOR TASK SPECIFIC, METERED BANDWIDTH CONTROL WITHIN SHARED CLIENT ENVIRONMENT ON MOBILE COMMUNICATIONS PLATFORMS", which is also incorporated herein by reference in its entirety.

FIELD OF THE DISCLOSURE

The present disclosure relates generally to bandwidth allocation on mobile devices, and more particularly to systems and methods for metering bandwidth in a shared client environment on mobile communications devices.

BACKGROUND OF THE DISCLOSURE

Mobile network operators (MNOs) are responsible for an increasingly large portion of the communications network infrastructure in the modern world. Typically, MNOs are defined as companies that have both a licensed frequency allocation of the radio spectrum over which they can operate, and the required infrastructure needed to run an independent mobile network. Such infrastructure may include, for example, GSMs (global systems for mobile communications), CDMAs (code division multiple access systems, which are digital radio systems that transmit streams of bits or PN codes) and other core mobile network related infrastructure, such as mobile switching centers (MSCs) and a radio access network.

As mobile networks have continued to develop, the companies providing the services required to operate and use these networks have had to adopt newer business models to keep pace with evolving consumer demands. In combination with changing government regulations, this has led to the evolution of mobile virtual network operators (MVNOs).

Unlike MNOs, MVNOs do not have their own licensed frequency allocation, and frequently do not even have all of the infrastructure required to provide mobile communications. Instead, MVNOs work in concert with other companies having these assets to provide mobile communications platforms to customers. In some instances, a company may operate as both an MNO and an MNVO. For example, if an MNO lacks a frequency spectrum allocation in a particular geographical region, it may operate as an MVNO in that region.

Significant efficiencies are obtained by the MVNO business model, since an MVNO does not incur the significant capital expenditure on spectrum and infrastructure that an MNO does, nor does it have the time consuming task of rolling out extensive radio infrastructure. Rather, this division of responsibilities allows MVNOs to concentrate on their role of value-added service providers, while many aspects of network maintenance and operation are performed by other companies behind the scenes.

The continued evolution of mobile communications networks has brought about even further specialization of services. Hence, while some MVNOs run their own billing and customer care solutions (commonly known in the art as business support systems (BSS)), others delegate these services to a mobile virtual network enabler (MVNE). MVNEs provide services to MVNOs such as billing, network element provisioning, administration, operations, support of base station subsystems and operations support systems, and provision of back end network elements, to enable provision of mobile network services such as cellular phone connectivity.

A MVNE typically does not have a relationship with end-user customers. Instead, an MVNE provides infrastructure and services to enable MVNOs to offer services and have a relationship with end-user customers. Hence, MVNEs allow MVNOs to focus on their core strengths (typically brand, customer loyalty and marketing), while leaving the back-end enablement and operations to the MVNEs. An MVNE typically also has shared risk-reward arrangements with the MVNO with various kinds of revenue sharing models which are usually tied to the number of subscribers that the MVNO has projected in their business plan.

From a systems standpoint, designing an MVNE is a complex process that frequently includes taking commercial off-the-shelf applications and converting them to work in a multi-tenancy model in a seamless fashion. Here, multi-tenancy refers to the principle in software architecture where a single instance of the software runs on a server, serving multiple client organizations (tenants). Multi-tenancy may be contrasted with a multi-instance architecture where separate software instances (or hardware systems) are set up for different client organizations.

With a multitenant architecture, a software application is designed to virtually partition its data and configuration, and each client organization works with a customized virtual application instance. In a multi-tenancy environment, multiple customers share the same application, running on the same operating system, on the same hardware, with the same data-storage mechanism. The distinction between the customers is achieved during application design, and hence, the customers do not share or see each other's data.

There are currently three main types of MVNEs. These may be categorized according to their MVNO solutions:

(a) Aggregator MVNEs: these offer consulting and integration services and have bundled all of the back-office network components through alliances. These promote their ability to quickly provide order-to-cash solutions to MVNOs.

(b) Aggregator MVNEs with their own service delivery platforms (SDPs): this includes aggregators which have developed one or more back-office solutions internally, and have complemented them with partnerships to provide end-to-end enablement services.

(c) Specialized enablers: these offer only parts of the back-office network such as messaging platforms, data platforms and billing solutions. They are not solely focused on the MVNO market.

The SDP associated with an MVNE is a set of components that provides a service delivery architecture (such as service creation, session control & protocols) for a particular type of service. SDPs became popular with the introduction of open standards as IP technologies were introduced, and with the rapid expansion of Voice-over-IP (VoIP) for transmission of voice data over packet networks and the Session Initiation Protocol (SIP) for standardized media control, especially regarding enterprise voice communication. In this new standards-supported environment, convergence of the voice and data worlds has become an avenue for the production of new and better consumer and business services.

The last few years have seen the introduction and proliferation of various SIP programming libraries and products based on the relatively new SIP standard, and the IP Multimedia Subsystem standard defined by the 3GPP (a collaboration between groups of telecommunications associations to make a globally applicable third-generation (3G) mobile phone system specification) has gained a substantial following. SDPs, whose power comes in large part from the quality and acceptance of these supporting standards, are rapidly gaining acceptance as widely applicable architectural patterns. SDPs are commonly considered for the telco type environments as core systems which interconnect the customer's access and network infrastructure with BSS and OSS systems (operational support systems), the computer systems used by telecommunications service providers (the term OSS is most frequently used to describe "network systems" dealing with the telecom network itself, supporting processes such as maintaining network inventory, provisioning services, configuring network components, and managing faults). SDPs in this context are usually associated to a particular service regime such as mobile telephones or for converged services.

SUMMARY OF THE DISCLOSURE

Figure 1:
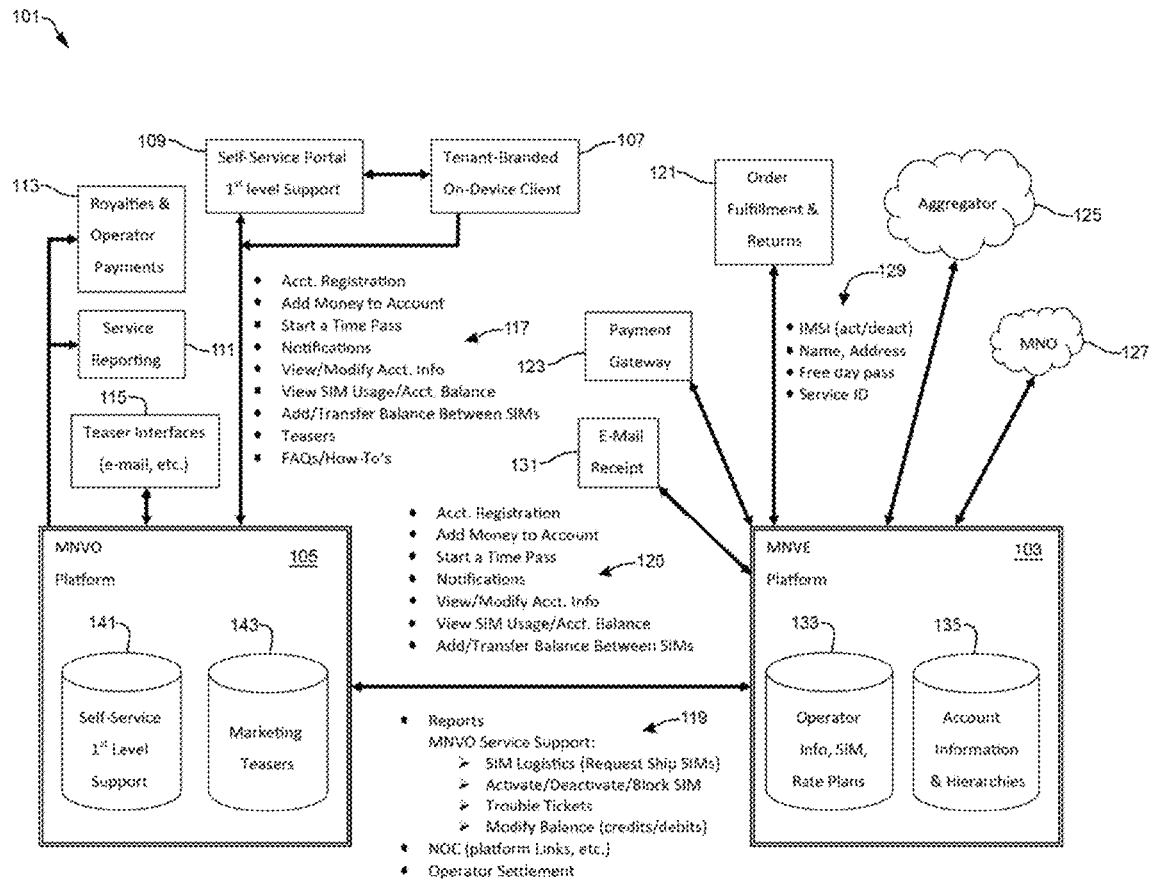
FIG. 1 is an illustration of a system architecture which may be used to implement the systems and methodologies described herein.

In one aspect, a communications system is provided which comprises (a) a first platform associated with an MVNE; (b) a second platform which is integrated with said first platform and which has a plurality of tenants associated therewith, wherein each tenant has a set of mobile communications devices associated with it, wherein each mobile communications device in the set has an instance of a client installed on it which maintains an open connection to a communications network, and wherein each client is equipped with a graphical user interface (GUI); and (c) a group of offers selected by a tenant which are displayed on the GUI of each member of the set of mobile communications devices associated with the tenant.

In another aspect, a method for providing offers over a mobile communications platform is provided. The method comprises (a) providing a first platform associated with an MVNE; (b) providing a second platform which is integrated with said first platform and which has a plurality of tenants associated therewith, wherein each tenant has a set of mobile communications devices associated with it, wherein each mobile communications device in the set has an instance of a client installed on it which maintains an open connection to a communications network, and wherein each client is equipped with a graphical user interface (GUI); and (c) displaying a plurality of icons on the GUI, wherein each of said plurality of icons is associated with a third party service provider and is hot-linked to a web page associated with the third party service provider.

In a further aspect, a data only device is provided which is equipped with an always-hot connection to the Internet or to another communications network.

In still another aspect, a method is provided for indicating the consumption of network connectivity. The method comprises (a) providing a mobile communications device which is equipped with a GUI and which is connected to a network; and (b) displaying a gauge on the GUI which graphically depicts the amount of network connectivity remaining.

In another aspect, a network adapter is provided which comprises (a) a connector adapted to releasably engage a port in a mobile communications device, thereby bringing the network adapter into electrical communication with the mobile communications device; (b) a tangible memory medium; and (c) a computer program disposed in or stored in said tangible memory medium and containing suitable programming instructions which, when executed, provide the mobile communications device with free broadband access to a network; wherein said free access is limited to specific sites on the network.

In another aspect, a system is disclosed for providing broadband communication services, comprising (a) a first entity which distributes wireless mobile communications devices to consumers; and (b) a second entity which provides broadband wireless access to a network; wherein said second entity provides said broadband wireless access on a white label basis to said first entity, and wherein said wireless mobile communications devices are configured to provide broadband wireless access to the network under a private label applied by the first entity to the white label broadband wireless access.

In still another aspect, a method is disclosed for providing broadband communication services. The method comprises (a) providing broadband wireless access to a network; and (b) selling broadband wireless access to a first entity on a white label basis, wherein said first entity distributes wireless mobile communications devices to consumers, wherein said wireless mobile communications devices are configured to provide broadband wireless access to the network under a private label applied by the first entity to the white label broadband wireless access.

In a further aspect, a method is disclosed for providing broadband communication services. The method comprises (a) obtaining, on a white label basis, broadband wireless access to a network; (b) applying a private label to the broadband wireless access; and (c) distributing wireless mobile communications devices to consumers, wherein said wireless mobile communications devices are configured to provide broadband wireless access to the network under the private label.

In yet another aspect, a method is provided for controlling access to applications or services over a network which includes (a) a plurality of client mobile communications devices, and (b) a network appliance equipped with (i) a product catalog which contains a listing of a plurality of applications or services, and (ii) a set of service rules which governs access to any of the applications or services in the product catalog by the client devices. The method comprises (A) receiving a request, from one of the plurality of client devices, for an action selected from the group consisting of (a) activating an application or service, and (b) renewing a previously activated application or service; (B) determining whether the request is allowable by (i) ascertaining whether the requested application or service is in the product catalog, and (ii) ascertaining whether the service rules permit the client device to access the requested application or service; (C) if the request is allowable, updating the network service appliance to indicate that the requested service or product is allowed for the requesting client device; and (D) if the request is not allowable, sending a notice to the requesting client device that access to the requested application or service has been denied.

In still another aspect, a method is provided for controlling access to applications or services available on a second network by a plurality of client mobile communications devices on a first network, wherein the first network includes (a) a first database comprising (i) a product catalog which contains a listing of a subset of the applications or services available on the second network, and (ii) a set of service rules which governs access to any of the applications or services in the product catalog by the client mobile communications devices; (b) a second database which specifies the applications or services that have been activated for each of the plurality of client mobile communications devices; and (c) a network appliance which is in communication with the second database and which grants access by each of the client mobile communications devices to the respective applications and services specified as active for that device. The method includes (a) receiving a request, from one of the plurality of client mobile communications devices, for an action selected from the group consisting of (i) activating an application or service, and (ii) reactivating a previously activated application or service; (b) determining whether the request is allowable by (i) ascertaining whether the requested application or service is in the product catalog, and (ii) ascertaining whether the service rules permit the client device to access the requested application or service; (c) if the request is allowable, updating the second database to indicate that the application or service has been activated for the requesting client device; and (d) if the request is not allowable, sending a notice to the requesting client device that the request has been denied.

DETAILED DESCRIPTION

A1. Overview

Despite the aforementioned advances in the art and the evolution of SDPs, mobile communications platforms today are still limited in some material respects. In particular, such platforms, and the service offerings that have arisen around them, are premised on conventional models for providing mobile broadband services, typically involving monthly or annual subription fees. Such models do not account for or leverage the fact that many consumers access the Internet or other networks for specific purposes. Moreover, such models are primarily geared towards providing services such as broadband access to consumers, without considering ways in which broadband access may be leveraged to provide new methods and systems for consuming online services.

It has now been found that new service models and product offerings, and new means for service consumption, may be provided by divorcing service offerings from conventional models of mobile broadband service consumption. This end may be achieved, for example, through the provision of a means by which consumers can consume services independently of mobile broadband, and through a means by which businesses are provided with new opportunities for deriving revenue streams independently of mobile broadband. In particular, business models are disclosed herein in which mobile broadband service may be used merely as a pipe for other services, offers and consumption models.

For example, in some of the systems and methodologies described herein, an on-device client is provided which is in communication with a platform associated with an MNVO (this platform may be integrated with another platform associated with an MVNE). The device may be in an "always connected" or "always hot" relationship with a mobile broadband service which is free to the user. However, unless the user buys general broadband access (by, for example, purchasing 30-day service pass), the user can only go to a website associated with the MNVO (or to a set of websites associated with or sponsored by tenants of the MNVO), and can only get access to offers provided by tenants of the MNVO. Hence, the user is given an "always hot" connection for free, but the user is restricted in terms of what the user can do with the service.

This arrangement facilitates new ways of doing business and providing services independently of mobile broadband service. This arrangement also shifts the traditional paradigm away from purchasing network (e.g., Internet) connectivity based on time and data, to one where connectivity may be purchased based on what the consumer wants to do with the connectivity.

As an example, a consumer electronics company that provides mobile communications devices to consumers may use such an arrangement to maintain a hot connection to the device. This hot connection may then be utilized to stream or display offers to consumers and to provide consumers with the ability to browse certain designated websites, even when the consumer does not otherwise have access to the Internet or another network. As a result, the company has the ability to engage in revenue sharing activities with other parties in exchange for making offers from those parties available to the consumer over the "always hot" connection the company is providing.

As a further example, a service provider may use the systems and methodologies described herein to provide session-based network access to consumers. Hence, rather than paying for Internet access in general, the consumer has the ability to pay for a specific task, such as the ability to access the Facebook™ social network ten times, or the ability to watch a particular movie. The service provider (which may be, for example, an MNVO or a tenant thereof) thus has the ability to engage in revenue sharing with parties providing these sites or services, in exchange for making their site accessible or for providing a hotlink to their site in the real estate provided on the consumer's mobile communications device.

B1. System Architecture

FIG. 1 illustrates a first particular, non-limiting embodiment of a general system architecture which may be used to implement some of the systems and methodologies described herein. As seen therein, the system architecture 101 comprises a first MVNE platform 103 which is associated with an MVNE, and a second MNVO platform 105 associated with an MNVO.

The MNVE platform 103 is preferably an SDP and hence contains a set of components that provides a service delivery architecture (such as service creation, session control & protocols) for a particular type of service. The MNVE platform 103 has associated with it a first database 133 containing operator information, SIM information and rate plans, and a second database 135 containing account information and hierarchies. Of course, it will be appreciated that the MNVE platform 103 may contain additional databases, that the first 133 and second 135 databases may be combined into a single database, or that any the components of the first 133 and second 135 databases may be disposed in other (possibly additional) databases.

The MNVO platform 105 is a multitenant platform which interfaces with the MNVE platform 103 and with a plurality of tenant-branded on-device clients 107. The MNVO platform 105 has associated with it a first database 141 containing data for self-service first level support, and a second 143 database containing marketing teasers and other advertisement data. Of course, it will be appreciated that the MNVO platform 105 may contain additional databases, that the first 141 and second 143 databases may be combined into a single database, or that any the components of the first 141 and second 143 databases may be disposed in other (possibly additional) databases.

The MNVO platform 105 is further equipped with suitable client proxies to allow it to interface with the clients 107, and is also equipped with the necessary software and hardware to implement the desired functionalities 117 of the MNVO. Such functionalities 117 may include, but are not limited to, account registration, the ability to add money or credits to an account, starting a time pass, generating notifications, viewing or modifying account information, viewing SIM usage and account balances associated with a SIM, adding or transferring balances between SIMs, providing marketing teasers, and supporting a self-help tutorial, which may include frequently asked questions (FAQs) or information about how to perform common tasks ("how-to's").

The MNVO platform 105 and the MNVE platform 105 exchange information and otherwise cooperate to support various functionalities 119, 120 for the clients 107 and the associated users. Such functionalities 120 may include, but are not limited to, account registration, the ability to add money or credits to an account, starting a time pass, generating notifications, viewing or modifying account information, viewing SIM usage and account balances associated with a SIM, and adding or transferring balances between SIMs. These functionalities 119 may further include services required to support the operations of the MNVO, which may include, but are not limited to, providing reports, maintaining a network operations center (NOC), processing operator settlements, and providing support services to the MNVO. Such support services may include, but are not limited to, SIM logistics (such as requesting shipment of SIMs), activating, deactivating or blocking SIMs, processing trouble tickets, and modifying balances (e.g., applying credits or debits).

The reporting functionalities provided by the MNVO platform 105 include service reporting 111 and royalty reporting 113 to the tenants. The royalty reports typically include details on network usage and revenue sharing on a tenant-by-tenant basis. The service reports typically include details regarding the number of consumers that activated service on a given day, the number of users that have received their machines and powered up, and the number of users that have not used the service recently.

As previously noted, the MNVO platform 105 interfaces with a plurality of tenant-branded on-device clients 107. The clients 107 may be thick or thin clients, and may be browser-based. Each client 107 is equipped with an application programming interface (API) which has been defined to it. An MNVO may use the MNVO platform 105 to provide a tenant with white-label services so that the tenant has the ability to use the client 107 provided by the MNVO, and can simply brand it. The tenant may also provide its own client 107 and may cut to the API. As part of the service offering, the MNVO platform 105 provides Wi-Fi, fixed and mobile broadband connectivity to its tenants.

Preferably, the MNVO works with each of the tenants to define a set of services the tenant wants to go to market with, establish goals and requirements, assemble the business processes required by the tenant, and instrument the client (in both the MVNE 103 and MVNO 105 platforms). From a consumer perspective, then, the consumer buys a service which is sold by the MNVO, and the MNVO and tenant work together to support the care of that service.

The MNVO platform 105 is preferably implemented on a server which is in communication with a self-service portal 109. The self-service portal 109 is defined in both the browser and the on-device clients 107, and is preferably implemented with a multi-layer protocol. The self-service portal 109 provides self-service $1^{st}$ level support to consumers, and allows them to access the functionalities 117 described above. The MNVO platform 105 is also preferably equipped with teaser interfaces 115 (such as e-mail) which may be used for marketing and advertisement purposes.

B2. MNVE Platform

The MNVE platform 103 is a service delivery platform through which the MNVE interfaces with an MNO 127 and a service aggregator 125. The MNVE platform 103 interacts with modules or services which provide e-mail receipt 131, a payment gateway 123 and a service for order fulfillment and returns 121. The latter service processes the activation/deactivation of IMSIs (international mobile subscriber identities), subscriber names and addresses, free day passes, and service IDs.

Referring still to FIG. 1, the MNVE platform 103 acts as a service delivery platform which preferably provides comprehensive convergent rating and charging capabilities to handle advanced prepaid, postpaid, interconnect and roaming requirements. This platform may leverage a software solution which offers a complete solution for multiple play customer care and billing (CC&B). The CC&B may be modular and rapidly deployable, and preferably supports such processes as customer initiation, order management, customer activation, service provisioning, customer care, usage rating, invoicing, accounts receivable, collections and reporting. The software solution also preferably allows the MVNO to manage complex, multi-layered relationships and create service packages consisting of multiple voice and value added services (VAS). The software solution may be deployed in a multi-tenant configuration so as to enable the SDP to support specific customer management processes, and to order management workflows and billing configurations for each of its MNVO customers on a single instance of the software.

The software solution preferably affords the flexibility for the MNVO to provide custom solutions which are configured to the specific operational requirements of the MNVO. The MNVO customers benefit from the ability to support their brands with multiple service combinations and advanced rating and charging options.

The software suite may also provide a range of customer management and billing solutions which enable the MNVO to deliver a personalized and effective customer experience, expand service and product offerings and increase operational efficiency. The software solution may be based on a modular product portfolio that includes billing, rating, product catalog, CRM, self care, e-billing and data analysis. In a preferred embodiment, the software solution includes the following modules:

(a) a web-based customer management module that centrally manages customer information and processes the workflow of customer lifecycle events;

(b) an event and usage based rating engine which processes complex rating schemes in real-time and supports rating hierarchies for vendor, partner and other third party compensation;

(c) a robust billing and invoicing engine that processes invoices, calculates periodic charges (usage, recurring, one-time, credits) and applies applicable discounts, promotions and taxes; and (d) catalog software that enables the MNVO to define and manage an enterprise catalog of convergent product offerings and packages with advanced pricing and discount schemes.

B2. MNVE Platform Components

Customer Management Module

The web-based customer management module enables the MNVO to establish an operational framework to build a customer base, while also attracting new customers. This module is preferably a web-based customer management application which provides service providers with the following functionalities: (a) customer relationship management (CRM), (b) partner management, (c) order management, (d) workforce management, (e) resource management, (f) service configuration and provisioning, (g) accounts receivable, and (h) cash collections. These functionalities are preferably integrated into a single, unified front-end HTML framework that provides a detailed view of all customer information, while streamlining the business processes between activities.

The web-based customer management module may be adapted to provide a 360° view of all customer related information and activities. The customer centric functionality of the customer management module enables customer service representatives (CSRs) to quickly respond to all customer inquiries and requests from a centralized application. Hence, with the customer management module, CSRs can avoid having to access multiple applications or having to transfer customers to other departments.

The customer management module also preferably processes customer lifecycle events using a flexible, rule-based workflow mechanism and supports advanced task management with resolutions and escalation procedures. Customer-oriented functions, such as customer registration, service activation, online pricing plan assignment, customer request and complaint handling, the issuance of letters and notices, and customer profile modification, may all be supported within the framework of an automated workflow mechanism.

The order management processes for the fulfillment of multiple play service orders in the customer management module are processed by an embedded workflow engine. Each step of the order management activities are configured according to specific operational business processes and policies covering the initiation, modification and termination of services, the automatic provisioning of interfaces, and the fulfillment of orders to external devices and third parties. The order management features of the customer management module support the configuration, validation and assignment of complex services and bundles.

B3. MNVE Platform Components

Rating Engine

The event and usage based rating engine processes multiple play services and matrix structured rating schemes. This engine allows service providers to capture all revenue generating opportunities by processing complicated usage and event billing scenarios and hierarchical structure rating plans.

The event and usage based rating engine is preferably a carrier-grade rating engine that supports high volume processing of real-time and batch event and usage records. The event and usage based rating engine handles traditional retail, business and inter-carrier rating scenarios, as well as multi-layered rating hierarchies to support partner and vendor relationships. The event and usage based rating engine is preferably capable of rating expanded services, incentive-based pricing, discount structures and loyalty schemes. The event and usage based rating engine gathers usage information from internal and external sources, validates and formats the information, identifies the subscribers to be billed and rates the usage according specific subscriber usage plans. The event and usage based rating engine also preferably contains features for monitoring and controlling processes, including exception handling, re-rating and rollback functionalities.

From a single instance of the event and usage based rating engine, any combination of products and services may be rated. As a service-neutral rating engine, the event and usage based rating engine can process a high volume of usage records acquired from various external devices and gateways, while handling multiple input streams simultaneously. The event and usage based rating engine may also support pay-per-speed, pay-per-bandwidth, pay-per-view, pay-per-event, volume-based and IP time-based events.

The event and usage based rating engine preferably incorporates service level agreements and network quality of service ratings to accurately charge for usage. These rating capabilities may allow for processing both in-collects and out-collects for intricate partner compensation and reconciliation. The event and usage based rating engine also reevaluates data records to check for fraud, while rated usage output can be exported to external decision support systems (DSS) and data warehousing applications.

Standalone or multiple instances of the event and usage based rating engine may be deployed and run in parallel to increase operational throughput. The event and usage based rating engine preferably has a scalable design that is capable of handling rapid and unlimited increases in customer numbers and traffic volume.

B4. MNVE Platform Components

Billing and Invoicing Engine

The billing and invoicing engine compiles, generates and summarizes the elements that make up a customer invoice. The billing and invoicing engine calculates recurring charges based on customer price plans and compiles other relevant charges for a billing period. The billing and invoicing engine calculates the applicable taxes for the invoice according to each customer's tax plan.

The billing and invoicing engine is preferably a convergent billing engine that is able to calculate charges for a multiple of products and services on a consolidated bill or bill for each product and service separately. The billing and invoicing engine helps expand revenue streams by supporting volume discounts, cross-product discounts, rewards and promotions. With respect to volume discounts, the billing and invoicing engine is preferably adapted to aggregate customer usage according to several categories and to apply appropriate volume discounts. With respect to cross-product discounts, the billing and invoicing engine is preferably adapted to apply discounts based on diverse combinations of products and packages. With respect to rewards, the billing and invoicing engine is preferably adapted to dynamically calculate discount eligibility based on customer profiles and usages volumes, and to apply rewards in the form of discounts on the invoice, free usage or bonus points. With respect to promotions, the billing and invoicing engine preferably operates to ensure that customer usage of promotional offers remain within predefined limitations.

The billing and invoicing engine preferably allows invoices to be split into multiple billing cycles, while numerous bill runs can be validated and authorized in parallel. The billing and invoicing engine also preferably supports prorated billing for products and plans, according to actual active dates, and further preferably includes hot bill functionality for out-of-cycle and on-the-fly billing.

The billing and invoicing engine helps to ensure billing accuracy through an established bill verification and approval process, and provides detailed log files showing generation statistics in order to reduce billing errors. The billing and invoicing engine also preferably includes a rollback functionality that allows bill generations to be reversed and new invoices to be created.

The billing and invoicing engine preferably supports multiple billing formats and multilingual invoices according to specific operational and regional needs. The billing and invoicing engine may also handle third party billing to support the needs of distribution partners and revenue sharing scenarios. Preferably, the billing and invoicing engine outputs XML, PDF or PostScript files and includes a configurable archiving system.

The billing and invoicing engine is preferably built with an architecture that enables multiple bill runs to be processed in parallel. Preferably, bills can be viewed during the validation stage before being committed to the storage database in order to perform quality assurance on output.

B5. MNVE Platform Components

Catalog Software

The catalog software is preferably an enterprise product catalog that allows service providers to construct and manage a catalog of complex product and package offerings with advanced price discount schemes. The catalog software may be utilized to improve operational efficiency by removing the need to manage multiple instances of product information in different OSS/BSS systems.

The catalog software preferably integrates product information with pricing strategies and synchronizes the product catalog across all OSS/BSS systems. It may support customer-based processes with relevant product information related to customer product fit.

Order management processes are preferably centrally defined in the catalog software so as to enable the configuration and validation of product fulfillment. The product codes stored in the catalog software may be mapped from one system to another for adjusting revenues and computing cost and revenue centers. Moreover, provisioning parameters relating to different product lines may be configured in the catalog software, thereby enabling centralized and unified control of the capabilities of various network elements. Also, price catalog and billing parameters may be managed centrally in the catalog software, thereby removing the need to define and maintain product information separately in different billing systems.

The catalog software may be adapted to support multiple play products and packages from fixed line, ISP, mobile, cable TV and utilities-based services. The catalog software may be adapted to allow multiple internal departments within a service provider to easily control various aspects of product offerings, configurations, pricing and discount schemes. The catalog software is preferably equipped with an automated workflow mechanism that enables separate product profiles and tasks to be defined and initiated by other applications in order to achieve a centralized repository for controlling product management.

The catalog software is preferably adapted to allow service providers to define prices for various products and packages and to adjust tariffs and create discount plans. The catalog software also preferably allows for the bundling of products across different business lines into new packages.

The catalog software may also serve as a centralized knowledge center for marketing and technical information about all products and packages. As a result, the catalog software streamlines business processes and reduces the time-to-market with associated defining new products and packages, while reducing operational overhead.

C1. Functionalities of MNVE Platform

Figure 2:
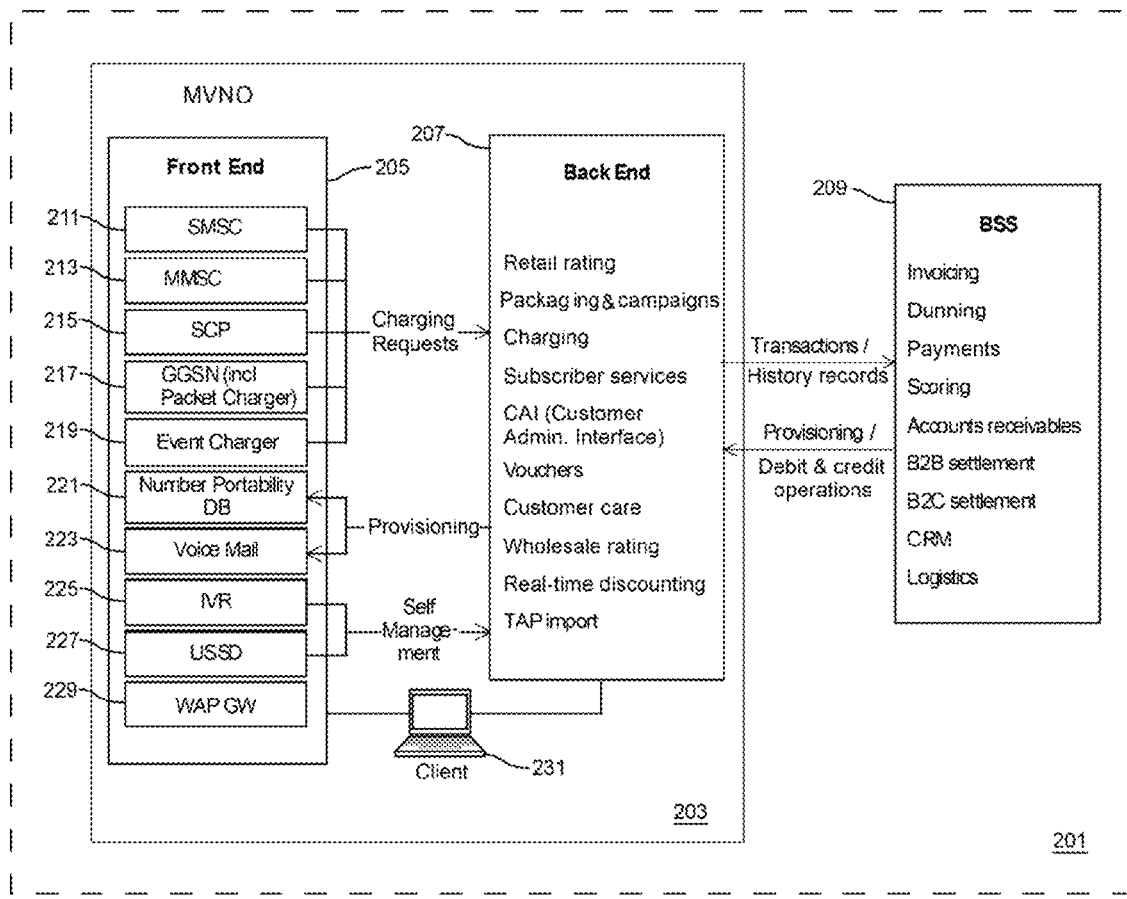
FIG. 2 is an illustration of the architecture of an MNVE platform which may be utilized in the systems and methodologies disclosed herein.

FIG. 2 illustrates the functionalities of a preferred embodiment of the MNVE platform 201. The MNVE platform 201 has a front end 205 and a back end 207 within the infrastructure of the MNVO 203, and a set of business support systems 209. The front end 205 and a back end 207 may be addressed through a client 231. Each of the functionalities provided by the MNVE is described in greater detail TABLE 1 below:

TABLE 1

Functionalities of MNVE Platform

| MODULES | DESCRIPTION |
| --- | --- |
| SMSC (211) | Handles SMS and real-time charging of SMS. Prior to granting an SMS submission (or reception) the SMS Charger requests permission from Charging. Real-time charging is applicable to roaming- and home network users. |
| MMSC (213) | Handles MMS traffic together with real-time charging of MMS. Prior to granting an MMS submission (or reception) the MMS Charger requests permission from Charging. Real-time charging is applicable to roaming- and home network users. |
| SCP (215) | Handles call control and real-time charging of voice/data/fax/video calls. All traffic is monitored in real time with refusal of service if e.g. insufficient funds. |
| GGSN (incl. Packet Charger) (217) | Handles real-time charging of packet traffic. Prior to granting data traffic the Packet Charger requests permission from Charging. Real-time charging is applicable to roaming- and home network users. |
| Event Charger (219) | Handles event charging requests from external applications such as content providers and value-added service platforms. |
| Number Portability DB (221) | Number portability gives the service provider the means to use number portability information (network operator ID) for rating and traffic routing. |
| Voice Mail (213) | Flexible and integrated solution for recording and storage of voice messages. Includes features such as multi-language support, auto provisioning and self management (via USSD, etc), complete message convergence, e.g. MMS and e-mail voice message delivery. |
| IVR (225) | Handles various subscriber interactions, like top up management and customer self care with interactive voice responses. |
| USSD (227) | Handles various subscriber interactions, like top up management and customer self care with interactive text message. The USSD Gateway also acts as a USSD Menu Server, interacting with external applications. |
| WAP Gateway (229) | Handles all WAP traffic. |
| Charging | Receives charging requests and ensures these are rated, reserved and committed. |
| Rating | Responsible for rating all traffic types for all subscription types. |
| Subscriber services | Contains customer, account and subscription data. Great flexibility in creating customer structures/packages, loyalty bonuses, etc. Includes tools to administrate customer-related logistics (in batch or individually) for phone numbers and SIM cards. |
| Vouchers | Voucher Management handles creation and management of vouchers, virtual calling cards and PIN codes. Full voucher lifecycle logistics are supported. |
| B2B and B2C accu-mulations | Responsible for handling billing, i.e. generation of invoicing files. Contains CDR data that is kept online for a set period and then archived/exported to other systems. |
| Outbound and inbound provisioning | Outbound provisioning is handled towards external systems such as HLR. Inbound provisioning is handled via CAI (Customer Administration Interface). |
| Discounting | Accumulation based discounts. |
| TAP Import | Importing and B2C charging of TAP3 roaming files. |
| Client | The Client is a graphical user interface (GUI) for configuration and creation of products and services, rate plans and billing schemes, as well as administration and management of the system. |

D1. On-Device Client

Figure 3:
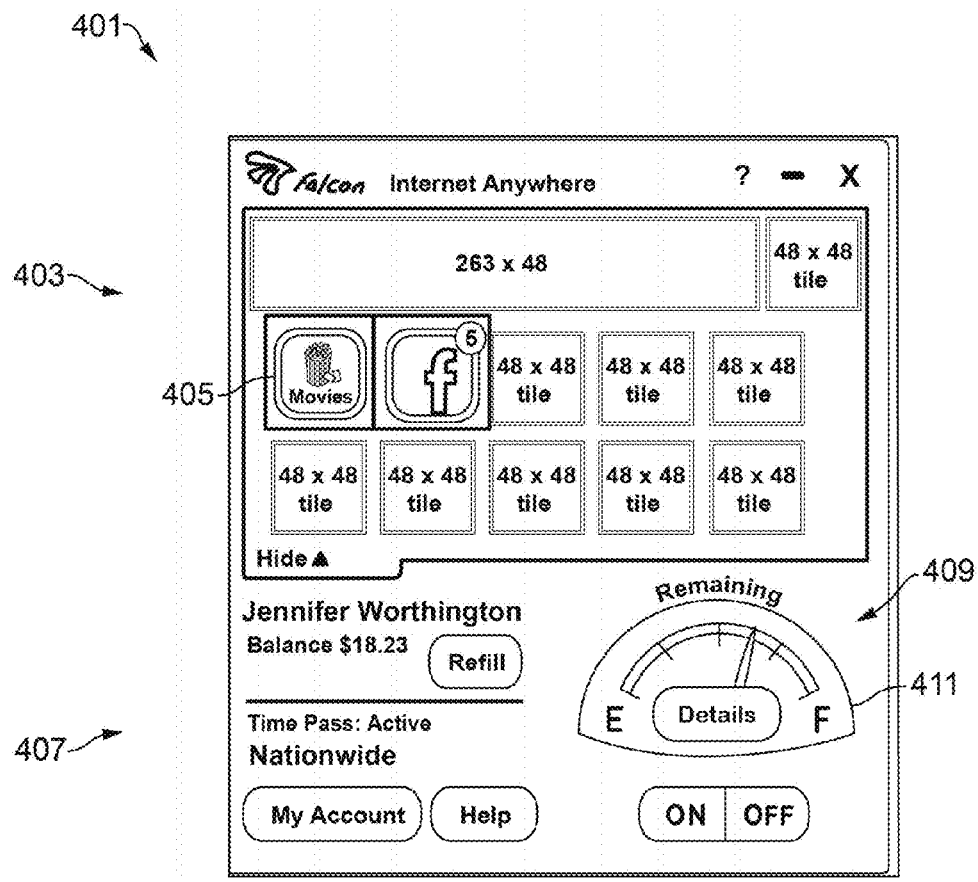
FIG. 3 is an illustration of a screenshot of an embodiment of the GUI of an on-device client in accordance with the teachings herein, which depicts the gauge feature used to depict the amount of connection time or data remaining that is still available to a user.

FIG. 3 depicts a particular, non-limiting embodiment of a GUI 401 which may be associated with an instance of a client installed on a mobile communications device in some of the systems and methodologies disclosed herein. In some such embodiments, each tenant on an MNVO (see, e.g., FIG. 1) may have a set of mobile communications devices associated with it, and each mobile communications device in a set may have an instance of such a client installed on it.

As seen in FIG. 3, the GUI 401 has a first display portion 403 on which a plurality of tiles 405 or icons are displayed, and a second display portion 407 on which status information 409 relating to the user's account is displayed.

The status information 409 includes a gauge 411, similar to a fuel gauge on an automobile display. The gauge provides a real-time indication of resource consumption and, in particular, an indication of how much bandwidth usage or access or connectivity time is available to the user before replenishment will be necessary. Such a gauge 411 may be implemented by, for example, integrating time and bandwidth consumption rates into a numerical scale, in a manner analogous to the way a fuel consumption gauge on an automobile integrates the amount of fuel remaining in the fuel tank with the fuel consumption rate. Hence, the gauge 411 provides a visual indication of the consumption of data, network time or connectivity occurring on a device (such as, for example, a mobile communications device), and may be adjusted as any of these resources are consumed so that it depicts the current amount of network the resource remaining Consumption may be depicted as a function of any suitable variable, or combination of variables including, but not limited to, time and data transfer.

It will be appreciated that the gauge 411 may assume a variety of different formats. For example, into addition to the "fuel gauge" type embodiment described above, the gauge 411 may take the form of, or may include, various dials, graphs, bars, or partially shaded figures or gradients. By way of example, but not limitation, the gauge may utilize or take the form of any of the graphical depictions commonly used to indicate the remaining amount of battery life, fuel, or other consumable commodities in business or consumer oriented devices.

Each of the tiles 405 or icons in the first display portion 403 of the GUI 401 is an offer for a service. These offers may be provided by, or associated with, one or more tenants on an MNVO platform of the type depicted in FIG. 1. Such a tenant may be, for example, a third party service provider, and the tiles or icons 405 may be hot-linked to a web page associated with the third party service provider. In some embodiments, each tenant may have a plurality of mobile communications devices associated with it. In some embodiments, such devices may be "data only" devices.

Each offer can be expanded upon (in the second display portion 407) by selecting the tile 405 or by dragging the tile 405 into the second display portion 407, which causes a page to be displayed on the second display portion 407 of the GUI 401 that contains the details of the offer. In other words, selecting a tile 405 causes the focus of the second display portion 407 to change to the context of the offer.

Figure 4:
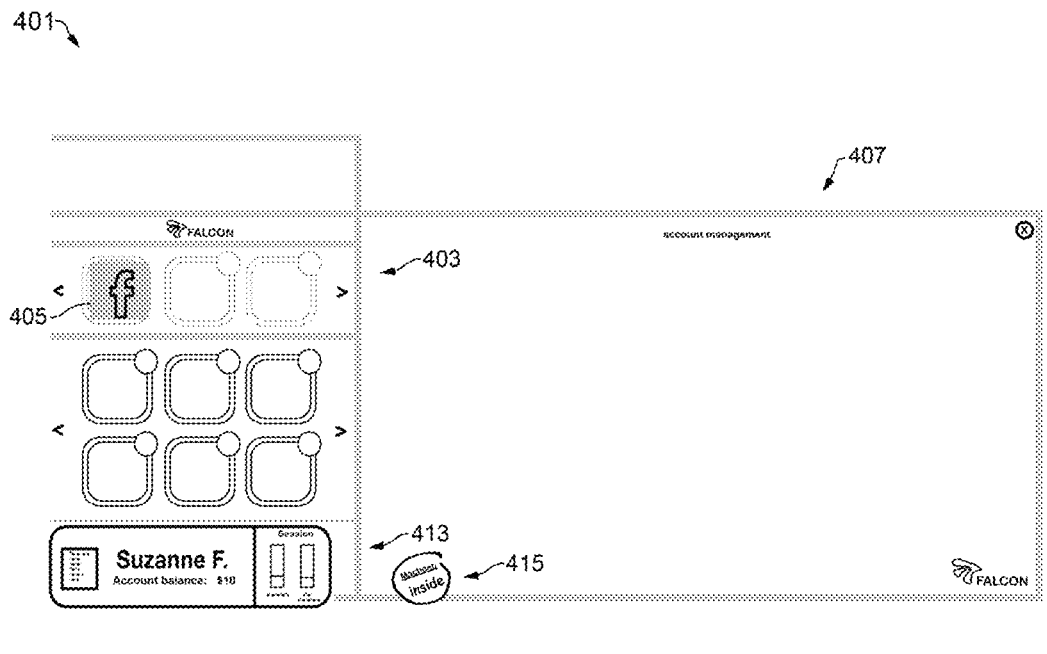
FIGS. 4-11 are screenshots of methods for using the GUI of an on-device client in accordance with the teachings herein for the presentation of offers to the user.
Figure 5:
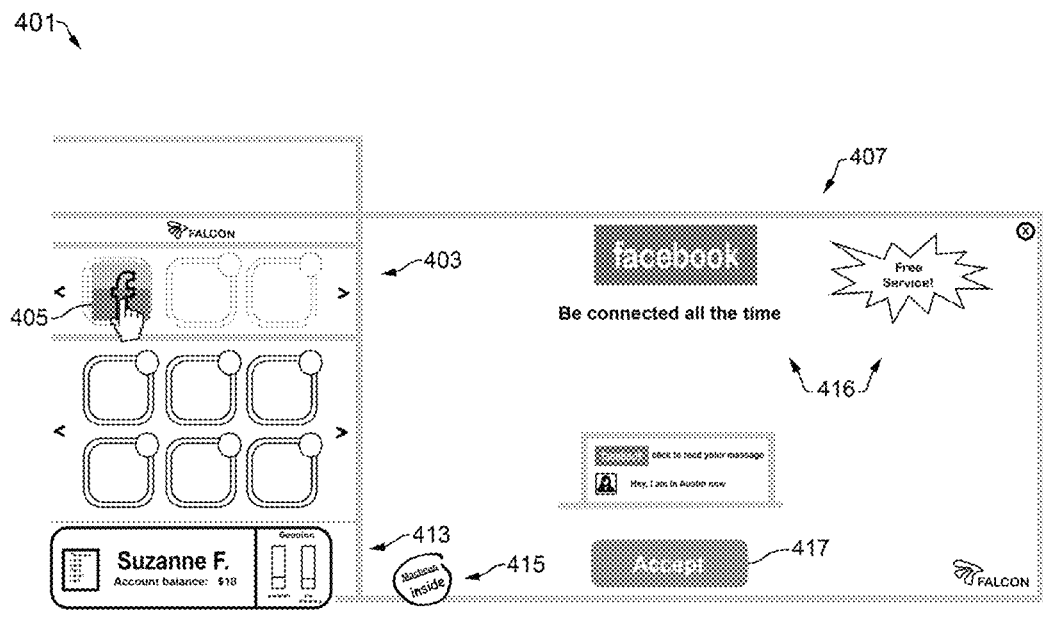

This process is illustrated in FIGS. 4-5 for a particular offer 416 (see FIG. 5) having to do with access to the Facebook™ social network. In particular, the offer 416 provides the user with free access to the Facebook™ social network, while other parts of the Internet or other networks may be unavailable to the user or may require a subscription, charge, time pass, or the like. The connection to the communications network that is provided to the user may be "always hot". Hence, in the context of the foregoing example, in such embodiments, the user may enjoy continuous access to the Facebook™ social network for as long as the offer is in effect.

Referring again to FIGS. 4-5, selecting a tile 405 may also cause revision in the gauge 411 shown in FIG. 3 to the gauge 413 shown in FIGS. 4-5. In particular, in the embodiment depicted, the gauge 411 of FIG. 3 is revised into the dual gauge 413 of FIG. 4 which shows the bandwidth and time remaining Selecting a tile may also activate one or more icons or indicia 415, such as the depicted "Macheen Inside" indicia, which may be displayed in a placeholder in the second display portion 407.

Figure 6:
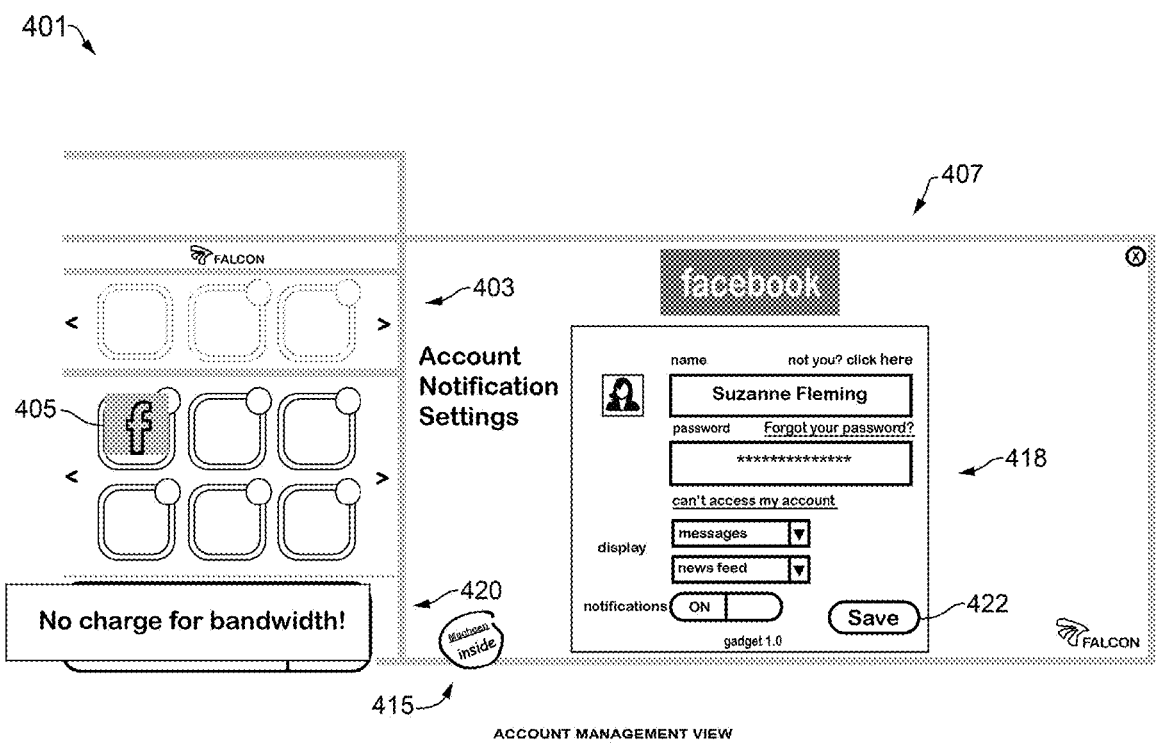

As shown in FIG. 5, the offer displayed in the second display portion 407 may include a radio button 417 or other means by which the user may indicate acceptance of the offer. When the user thus indicates acceptance of the offer, the icon corresponding to that service is added to the next free tile position available in the active services field within the first display portion 403 of the GUI 401. As shown in FIG. 6, this causes the second display portion 407 of the GUI 401 to display a configuration window 418 which allows the user to configure certain parameters of the service, and also causes display of a call-out 420 that indicates that the experience involves free bandwidth.

Figure 7:
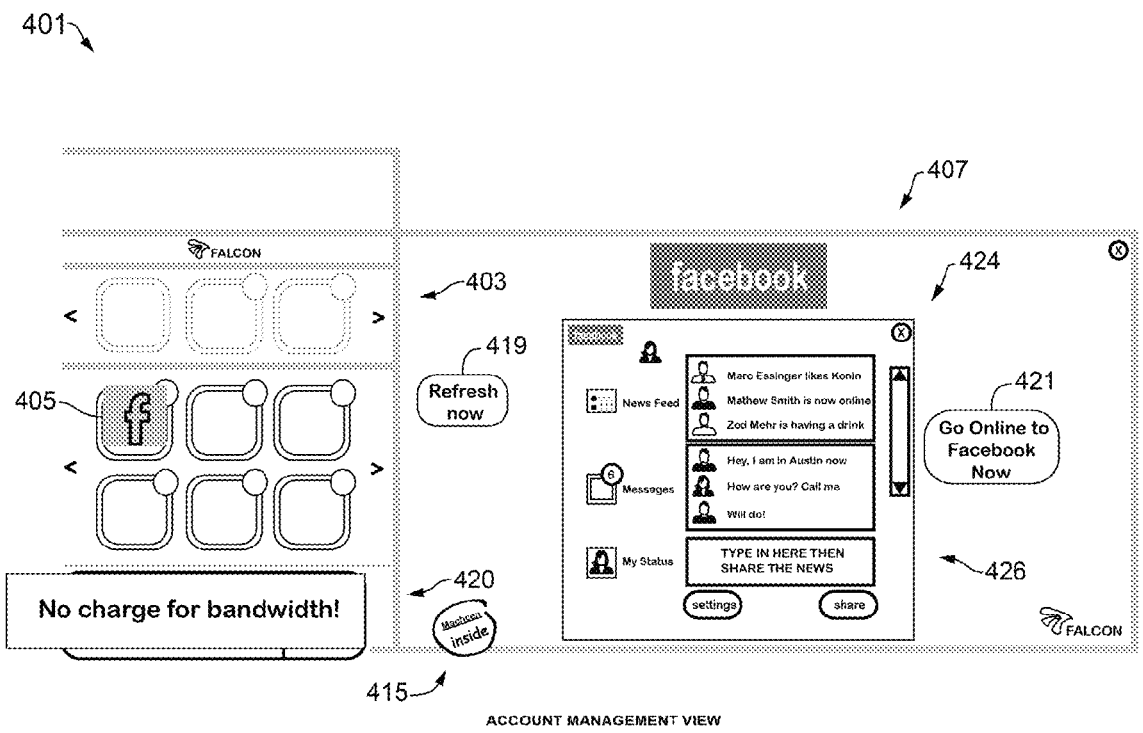

When the "save" radio button 422 is selected, the panel refreshes to show the current state of the service as shown in FIG. 7 which, in the embodiment depicted, contains information about the user's Facebook™ account 424. The resulting page is refreshed anytime the user selects the "Refresh now" radio button 419 or the corresponding panel focus icon 405. Clicking on any part of the notification panel 426 or selecting the "Go Online to Facebook Now" radio button 421 will take the user to the user's Facebook™ homepage, and will prompt the user to start a new time pass if there is currently no active session.

Figure 8:
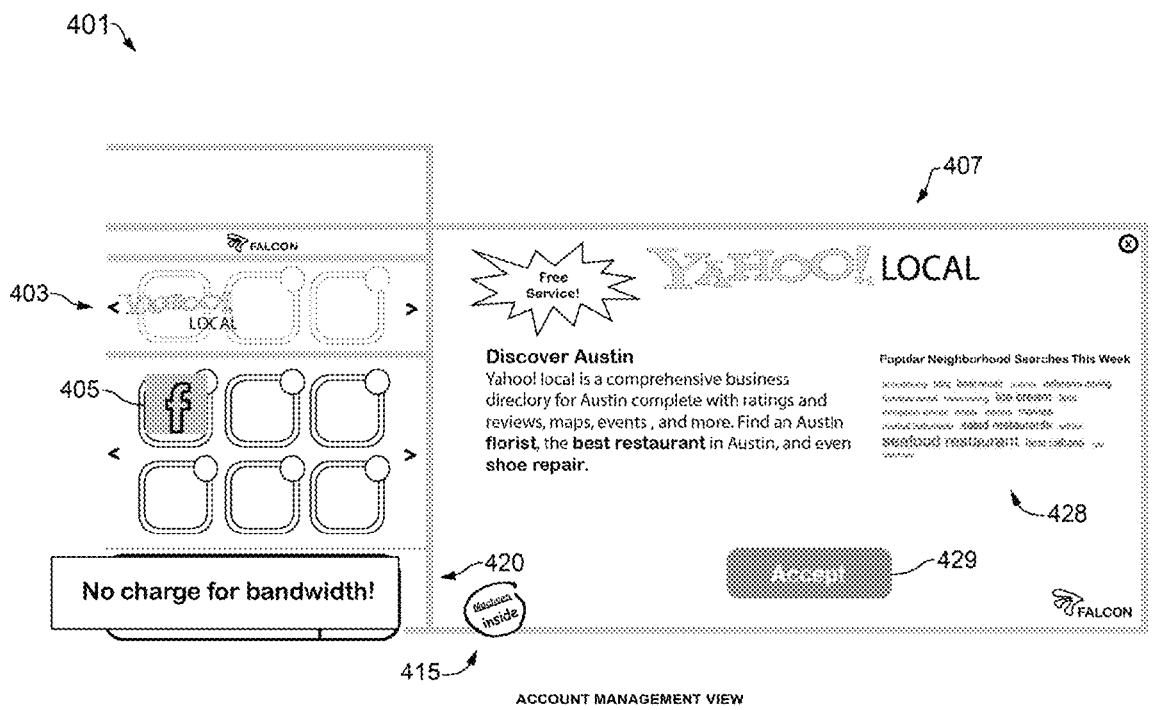
Figure 9:
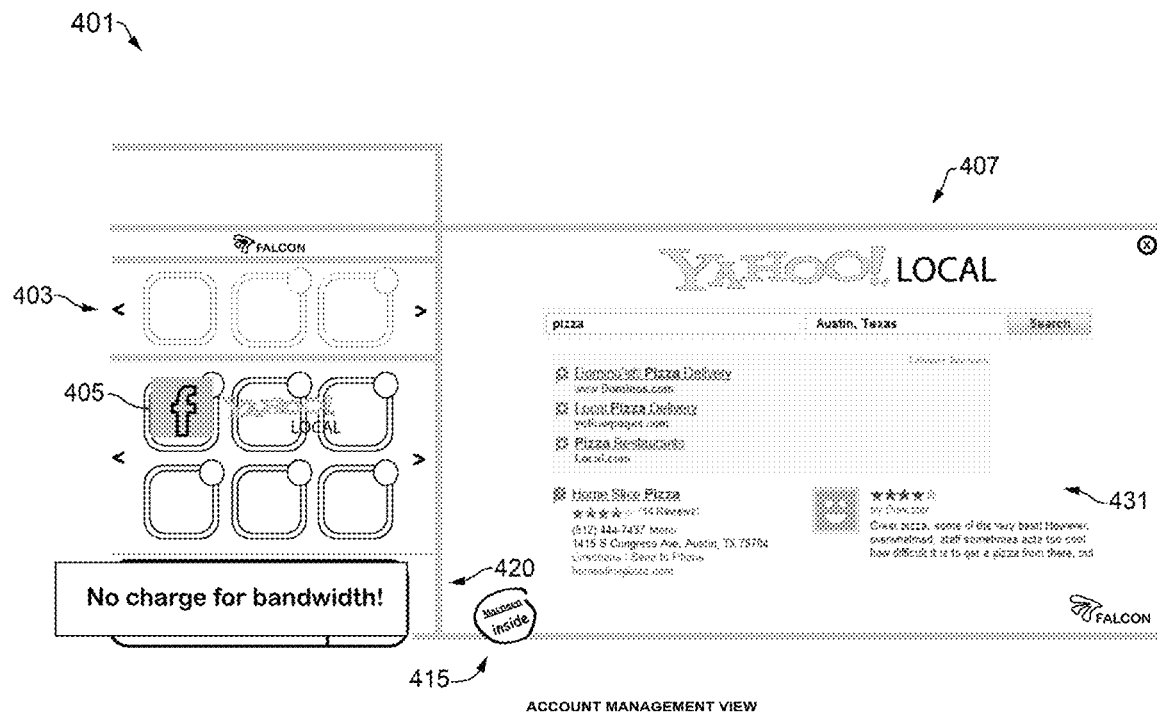
Figure 10:
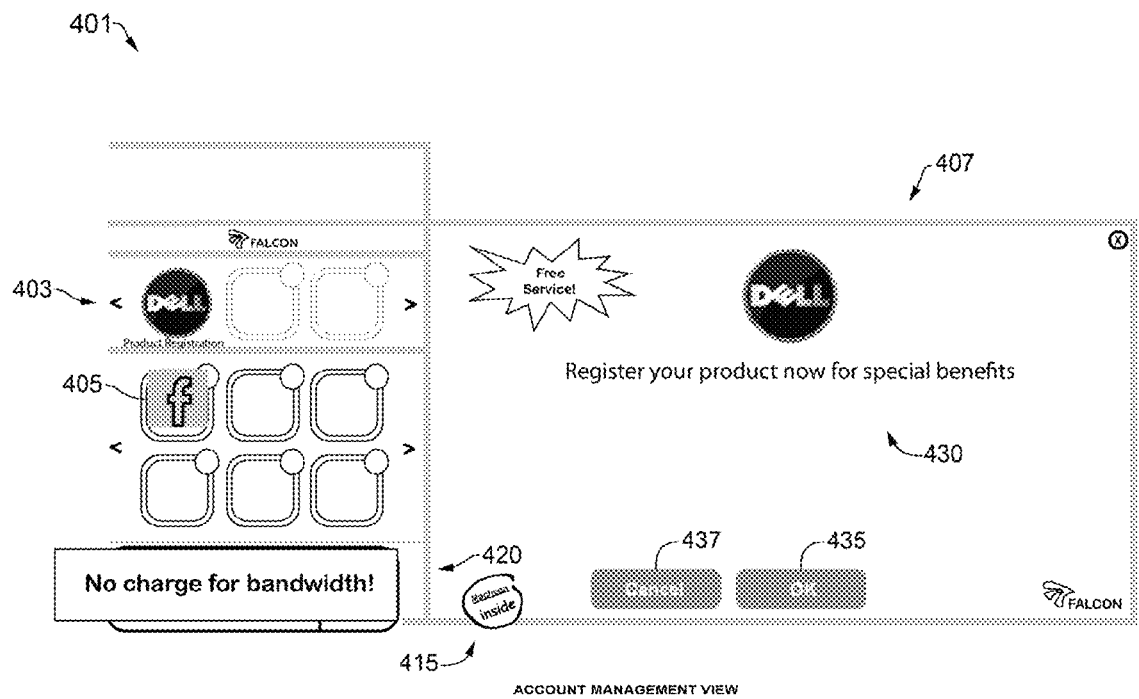

FIGS. 8-9 show another offer 428 (expanded), which may be accepted by selecting the "Accept" radio button 429 in the second display portion 407. This particular offer 428 is for free access to Yahoo!™ Local, a web portal for businesses, organizations, and other items of local interest 431 (see FIG. 9). Preferably, a heavier style is utilized and is associated with services that are available to dock, rather than just being used on the fly. By contrast, FIG. 10 shows a different offer 430 (expanded) which is associated with services used on the fly, such as the indicated product registration.

Figure 11:
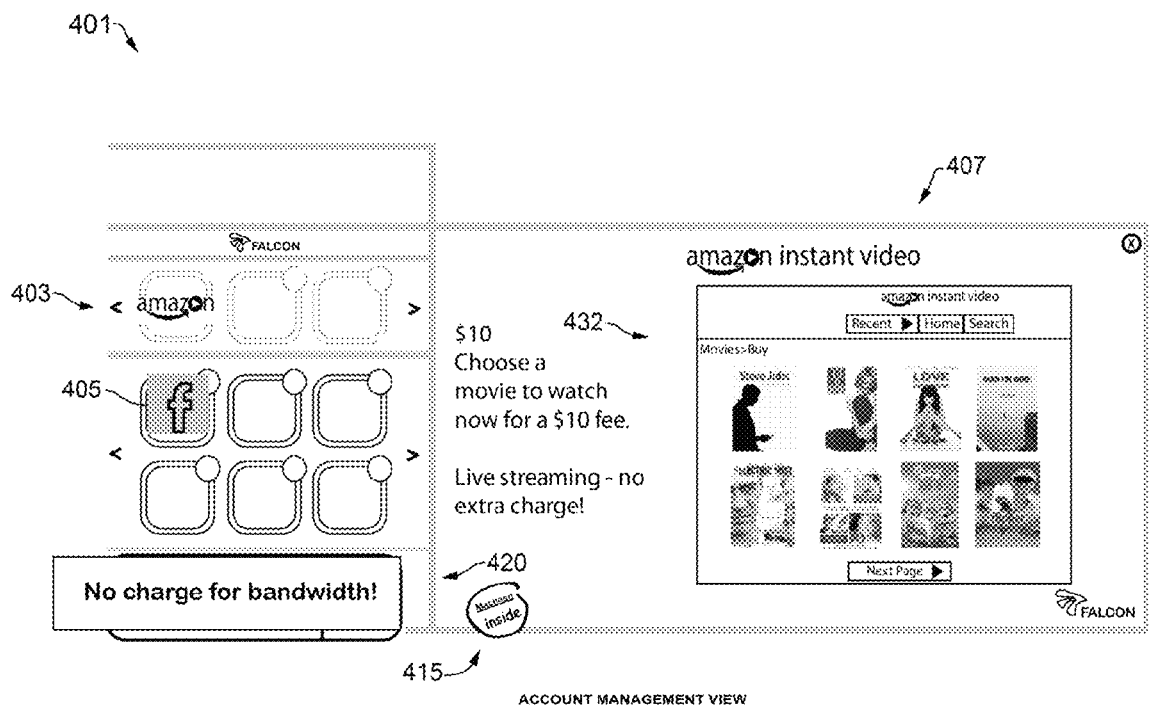

FIG. 11 shows another expanded offer 432, this one offering a selection of movies from Amazon's Instant Video™ service. This offer 432 illustrates the difference between one time transactions involving an account charge (here, $10 per movie purchased), versus a docked transaction involving a settlement.

Various modifications are possible with embodiments of the type depicted in FIGS. 3-11. For example, the order in which the tiles 405 or icons are displayed on the first display portion 403 of the GUI 401 may be dictated by various considerations, such as the order in which each tile 405 or icon was selected, or the frequency with which each tile 405 or icon was selected. Moreover, while it is preferred that the tiles 405 or icons all have the same size, embodiments are also possible in which this is not the case. Embodiments are also possible wherein a maximum size is dictated for the tiles 405 or icons, or wherein each icon is displayed within a tile 405 of fixed dimensions.

The manner in which the client is resident on the mobile communications device, or on a memory or storage medium associated with the mobile communications device, may also vary. For example, in some embodiments, the client may comprise software which is downloaded on a mobile communications device or is installed on the device by the device manufacturer, by a tenant on an MNVO, or by a party to a white label process or arrangement.

In other embodiments, the client (or a computer program or a set of suitable programming instructions which, when executed, provide the mobile communications device with free access to a network, subject to a predefined set of restrictions) may be resident on a network access device, such as a network access card or a wireless adapter. In particular, the client may be resident on or stored in a tangible medium or memory associated with such a device. Such a network access device may be equipped with a USB adapter or another suitable connector which is adapted to releasably engage a port (which may be, for example, a USB port) in, or is otherwise adapted to couple with, a mobile communications device, thereby bringing the network access device into electrical (or possibly optical) communication with the mobile communications device.

Embodiments of the type depicted in FIGS. 3-11 may also enable a wide variety of restricted access and consumption models. For example, in some embodiments, free access (or free broadband access) to a network may be limited to a single site on the network, or to a set of sites on the network (these sites may be, for example, sites associated with or designated by tenants on an MNVO). Access to other sites on the network may be extended on a subscription or pay-per-use basis, on a time limited basis (e.g., 30 minutes of access to the Wall Street Journal site per day), on a bandwidth usage, limitation, or allocation basis, or subject to various other restrictions or requirements. For example, such access may be subject to the requirement that a user view an advertisement prior to gaining access to a site or set of sites on the network.

C1. Metered Bandwidth Control

One significant feature of some of the systems and methodologies disclosed herein is the ability they provide to use Access Point Names (APNs) to create new business models to settle out mobile broadband access and/or usage. APNs are configurable network identifiers which are used by mobile communications devices when connecting to a GSM carrier (GSM refers to the Global System for Mobile Communications, a popular standard for mobile telephony system). The carrier uses the APN to determine the type of network connection that should be created, including such details as the IP address (or addresses) that should be assigned to the mobile communications device, the security methods that should be employed, and how the device should be connected to a private customer network. The APN identifies an IP packet data network (PDN) that a mobile data user wants to communicate with, and may also be utilized to define the type of service provided by the PDN (e.g., connection to a wireless application protocol (WAP) server, multimedia messaging service (MMS), and the like).

Figure 14:
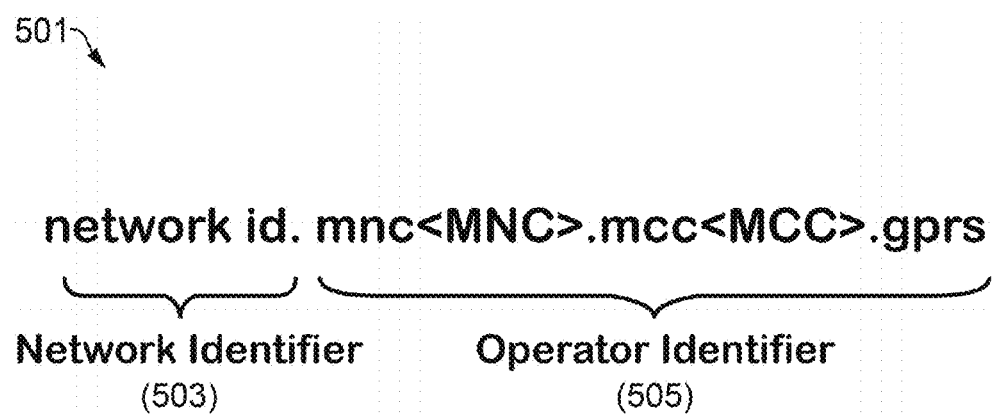
FIG. 14 is a diagram illustrating the structure of an APN.

As shown in FIG. 14, an APN 501 consists of a network identifier 503 and an operator identifier 505. The network identifier 503 defines the external network to which the gateway GPRS support node (GGSN) is connected, and may also include the service requested by the user. The operator identifier 505 defines the specific operator's packet domain network in which the GGSN is located.

The GGSN is a main component of the GPRS network, and is responsible for the interworking between the GPRS network and external packet switched networks, such as the Internet and X.25 WiMax networks. The GGSN acts as a router to a sub-network by hiding the GPRS infrastructure from the external network. When the GGSN receives data addressed to a specific user, it checks if the user is active. If it is, the GGSN forwards the data to the Serving GPRS Support Node (SGSN) serving the mobile user, but if the mobile user is inactive, the data is discarded. On the other hand, mobile-originated packets are routed to the correct network by the GGSN.

The SGSN is responsible for the delivery of data packets to and from mobile stations within its geographical service area. The SGSN implements packet routing and transfer, mobility management (attach/detach and location management), logical link management, and authentication and charging functions. The location register of the SGSN stores location information, such as, for example, current cell and current visitor location register (VLR). The visitor location register is a temporary database of the subscribers who have roamed into the jurisdiction of the MSC (Mobile Switching Center) which it serves. The location register of the SGSN also stores the user profiles (such as, for example, IMSI and addresses used in the packet data network) of all GPRS users registered with the SGSN. The IMSI (international mobile subscriber identity) is a unique identification associated with all GSM and UMTS (Universal Mobile Telecommunications System) network mobile phone users, which is typically stored as a 64-bit field in the SIM inside the phone.

APNs are utilized in an APN resolution process. APN resolution is the process of domain name system (DNS) lookup to determine the IP address of the GGSN that provides connectivity to the PDN identified by the APN. When a GPRS mobile phone sets up a data connection which it wants to connect to, APN resolution is used to select the GGSN and provide an IP address.

In some embodiments of the systems and methodologies described herein, a service provider may create and use one or more unique APNs to control access and/or charging for mobile broadband usage. A client associated with the service provider may control access to the service provider's marketing bandwidth APN. Consequently, traffic may be allowed or denied based on the application the customer is using.

Such an approach has several possible advantages. For example, it may no longer necessary when using this approach for the subscriber to purchase a general mobile Internet access session. In addition, a client associated with the service provider may allow access based on rules established by the service provider and/or the tenants associated with the service provider. As an example, these rules may (a) allow free access to client administration services provided by the service provider; (b) allow the subscriber to browse, buy or use content on the subscriber's device; (c) allow the subscriber to access or use teasers; and (d) allow the subscriber to access specific applications.

Figure 12:
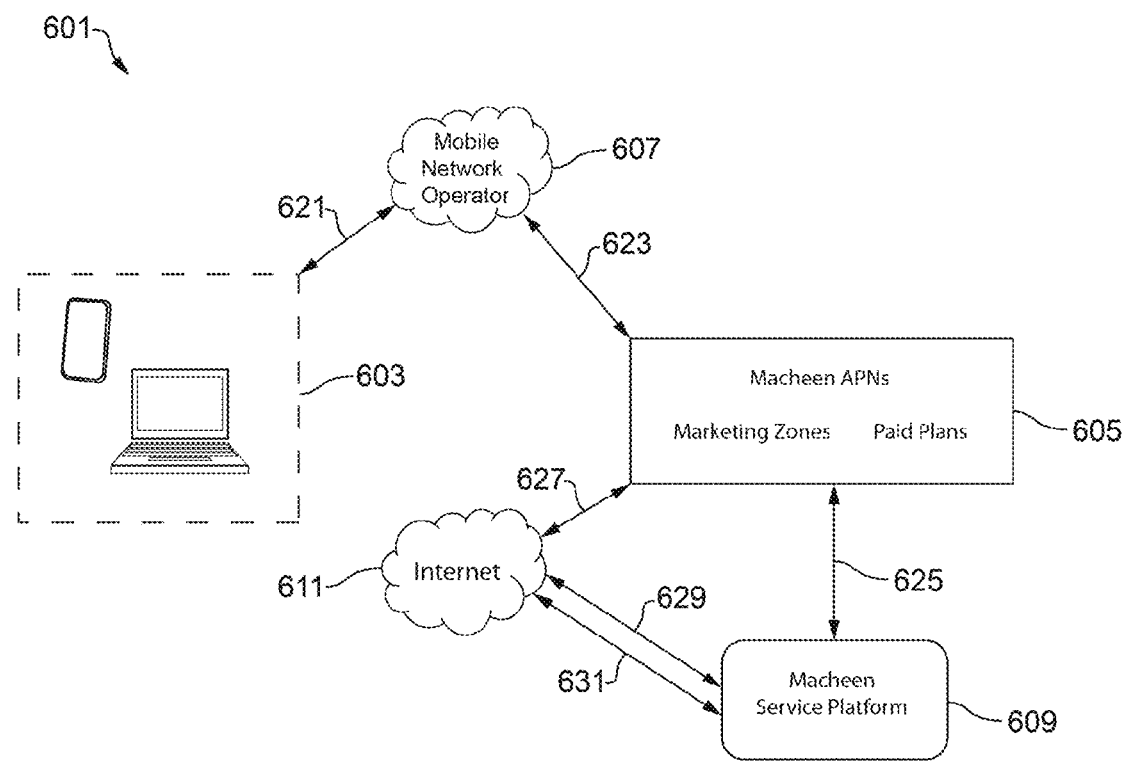
FIG. 12 is an illustration of an APN network architecture in an embodiment of a system in accordance with the teachings herein.

The foregoing configuration is illustrated in the system 601 depicted in FIG. 12. As seen therein, a client 603 associated with the service provider or MNVO (Macheen) is configured to use APN IP addresses 605 for paid service and marketing zones. The APN is configured to the MNO operator 607, which itself is configured or managed by the architecture of the service provider platform 609. This platform architecture checks access rights to the Internet 611 or other network, begins the metering process, and proxies to the IP address requested. If there is a client service panel request, the service provider makes API calls to the MNVE and returns information through the service provider and to the client 603. A regular APN is used in the event that the subscriber has a paid plan. If the request is to the Marketing Zone, then the APN is used which is associated with that pricing, charging or settlement model. Suitable communications links 621, 623, 625, 627, 629 and 631 may be employed in the architecture of the service provider platform 609 to enable the foregoing functionalities.

C2. Metered Bandwidth Control

Figure 13:
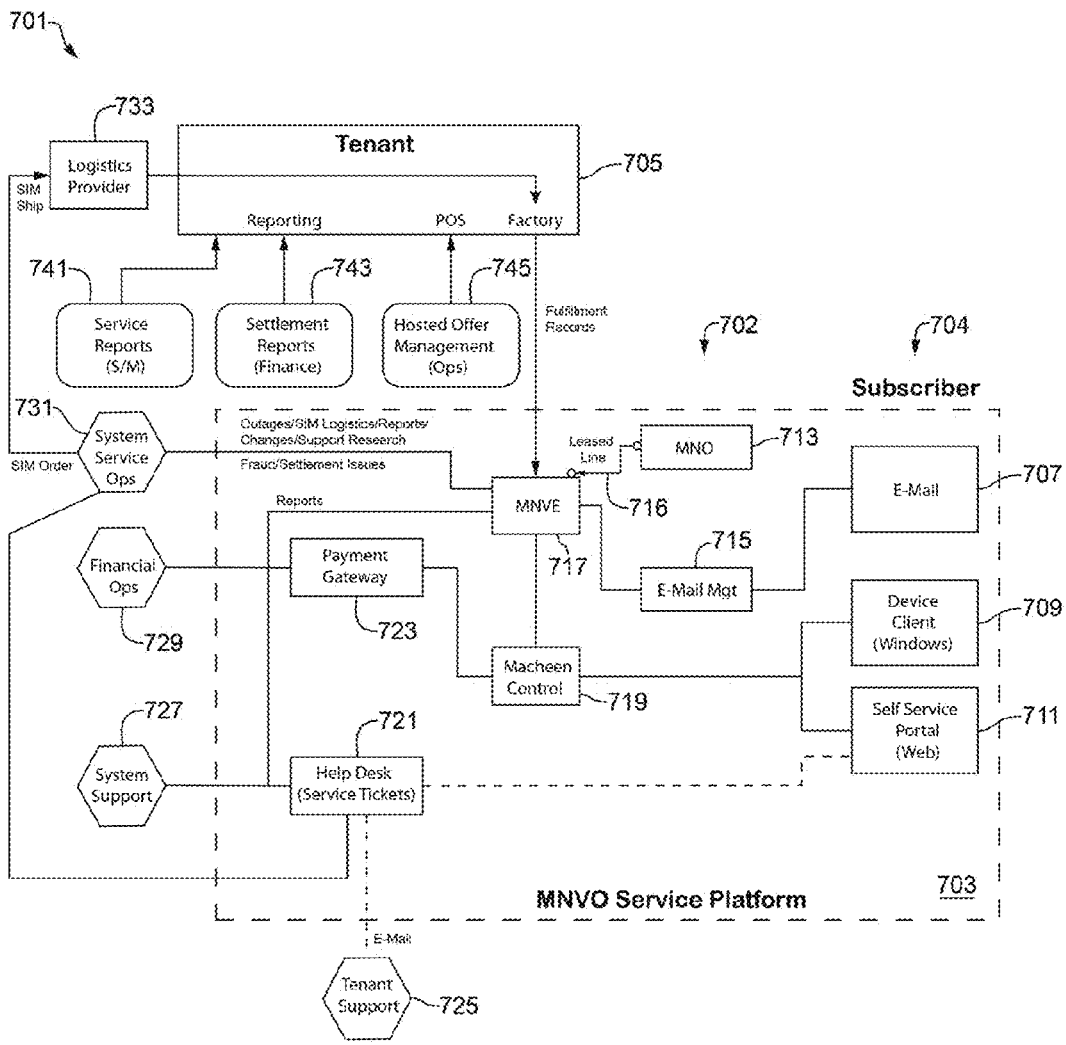
FIG. 13 is an illustration of the network architecture in an embodiment of a system in accordance with the teachings herein.

Some of the systems and methodologies disclosed herein are advantageous in that they provide the ability to implement white label processes for services to mobile communications devices. FIG. 13 depicts further details of a particular, non-limiting embodiment of a system 701 over which such a white label process may be implemented, it being understood that this system is preferably being implemented within the general system architecture depicted in FIG. 1.

The system 701 depicted in FIG. 13 includes a service platform 703 and one or more tenants 705. The service platform 703 includes both a service provider portion 702 and a subscriber portion 704. The service provider portion 702 includes such elements as the MNO 713, the MNVE 717, the leased line 716 between the MNO 713 and the MNVE 717, a control module 719, a help desk 721 for processing service tickets, and a payment gateway 723. The subscriber portion includes such elements as email service 707, the device client 709 and a self service portal 711. Associated with the service platform 703 are such support services as tenant support 725, system support 727, financial operations 729, and system service operations 731. System service operations 731 work with a logistics provider 733 for the order and shipment of SIMS cards.

Various reporting and point of sale (POS) services are provided to the tenant 705. These include service reports (S/M) 741, settlement reports (finance) 743 and hosted offer management (Ops) 745.

Typically, the business model of an MNVO revolves around selling mobile services to businesses and consumers. However, the white label processes described herein has a business model which is typically business to business to business, or business to business to consumer.

In the particular embodiment depicted, the process allows a first entity (such as, for example, an MVNO or MNO) to provide a second entity with a mobile service that they can brand as their own and market or sell as part of their bill of materials for the devices. For example, the second entity may be a consumer electronics company or other distributor or manufacturer of consumer devices (and especially mobile technology platforms, such as mobile communications devices and mobile computing devices). This arrangement allows such second entities to create unique mobile offerings that showcase their devices and enhance their brand identity, without requiring the infrastructure and overhead typically associated with developing and operating a mobile network.

Figure 15:
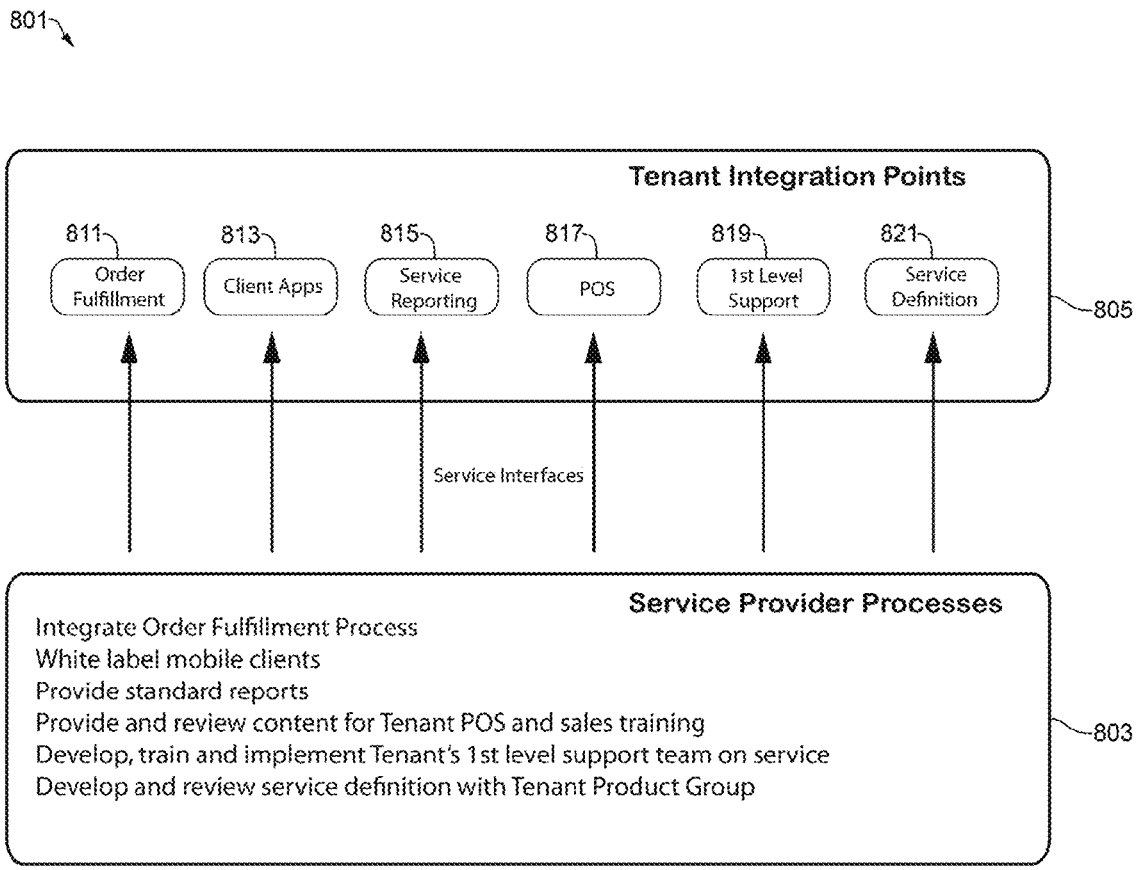
FIG. 15 is a diagram of an implementation of a white label process for mobile communications services in accordance with the teachings herein.

FIG. 15 illustrates a particular, non-limiting embodiment of a set of service interfaces 801 that may be associated with the aforementioned white label processes for services to mobile communications devices. As seen therein, the interface 801 comprises a set of service provider processes 803 and a set of tenant integration points 805. The set of service provider processes 803 include such processes as integration of the order fulfillment process, white labeling to mobile clients, the provision of standard reports, the provision and review of content for tenant POS and sales training, the development, training and implementation of the tenant's $1^{st}$ level support team on service, and the development and review of service definition with the tenant product group.

These processes are provided through service interfaces to various tenant integration points, such as order fulfillment 811, client applications 813, service reporting 815, point of sale (POS) 817, $1^{st}$ level support 819 and service definition 821. The set of service interfaces 801 depicted in FIG. 16 facilitates or enables a variety of novel services. For example, it allows access to a specific site or sites on the Internet or on another network, while blocking access to all other sites on the network when the host device is connected to mobile broadband. This service may be provided to the entire customer base, to a subset of the customer base identified by an attribute defined by the tenant, or to a single customer.

The service may be provisioned in a variety of ways. For example, the service may be provisioned in advance with start times and ends times, or it may be provisioned in real time (instantly) based on selections made by the user from among various options presented. The service may also be defined such that access to the service lasts indefinitely, ends at a time specified by the service provider, or ends after a defined number of minutes or a defined amount of data. Access to the service may also end in response to a new user action, such as clicking a different tile for access to a different website (see the embodiment of FIGS. 3-11). The service may be provisioned in real time (instantly) in response to user actions such as watching an advertisement, filling out a survey, clicking a link, or referring other users. Access to content may also be provided as a fixed charge, or free of charge to the subscriber by time increment.

Content services may be targeted to small or medium businesses, to enterprises, and/or to consumers. The content service definition may include access to one network or Internet service (e.g., a single URL), or a group of network or Internet services (e.g., many URLs). The content service may also be defined as access to the Internet or other network for a specific device application (such as, for example, games, email, or IM).

In some embodiments, the methodologies described herein may be implemented through the provision of a suitable hardware device that provides a mobile broadband connection. Such hardware may take the form, for example, of a USB stick, an internal modem, a network adapter, or another suitable device that allows access to pre-defined websites when a connection is made, but blocks access to all other websites unless the user purchases access to the full Internet. The hardware device may provide session-based access to the Internet or other networks based on time or data limits.

In some embodiments, the network or Internet access provided to a user may allow a specific application or set of applications on the user's device (or on the host device) to access the network, while denying access to other applications on the host device. For example, in a particular embodiment, Yahoo Instant Messenger™ may be permitted to access the Internet or other network on the host device, while other programs such as Skype™ and Internet Explorer™ are denied access. In these embodiments, service may be provided in all the same ways as indicated above.

In some embodiments, network traffic may be allowed from a specific protocol or protocols, while network traffic from other protocols is denied. For example, HTTP/HTTPS traffic may be allowed, but video may be denied (at least on a free-of-charge basis) using RTSP (Real Time Streaming Protocol) and/or HTTP/HTTPS as the blocker. This approach may allow the service provider and its tenants more control over the content that is accessed and consumed by users. By way of example, access to Facebook™ may be offered, but the user may not be permitted to watch videos. Service may be provided in all the same ways as indicated above.

In some embodiments, the systems and methodologies described herein may provide a customized display experience (different landing page). The landing page display may be based, for example, on (a) region, (b) machine or device type, (c) tenant, or (d) corporate sponsor. By way of illustration, each tenant on an MNVO may have one or more corporate sponsors associated with it, and the landing page experienced by a particular user or employed by an instance of a client may be dictated by the corporate sponsor of the tenant associated with that user or client. This approach allows for a customized icon/tile selection based on one or more of the foregoing factors.

One skilled in the art will appreciate that the services described herein are not mutually exclusive. Rather, they may be accumulated on top of each other. For example, a customer may purchase or receive free access to one Internet service (URL) for a given timeframe (for example, one limited to a predetermined start time and end time) by taking a certain action, and may then receive free access (or purchase access) to another Internet service (URL) on top of the existing access (that is, the user may accumulate Internet services access or multiple URLs). In some embodiments, free access may also terminate in response to an action taken by a user (such as, for example, clicking on a hot-link for access to a particular website, set of web sites, or class of web sites). The customer may also receive promotions for all SMB to receive access to the tenant's support portal, and may then purchase access to specific Internet services (URLs) (in other words, the customer may accumulate free access based on account characteristics, and individual access based on purchases). Of course, it will be appreciated that any combination of the previously outlined services may be accumulated one on top of another.

Figure 16:
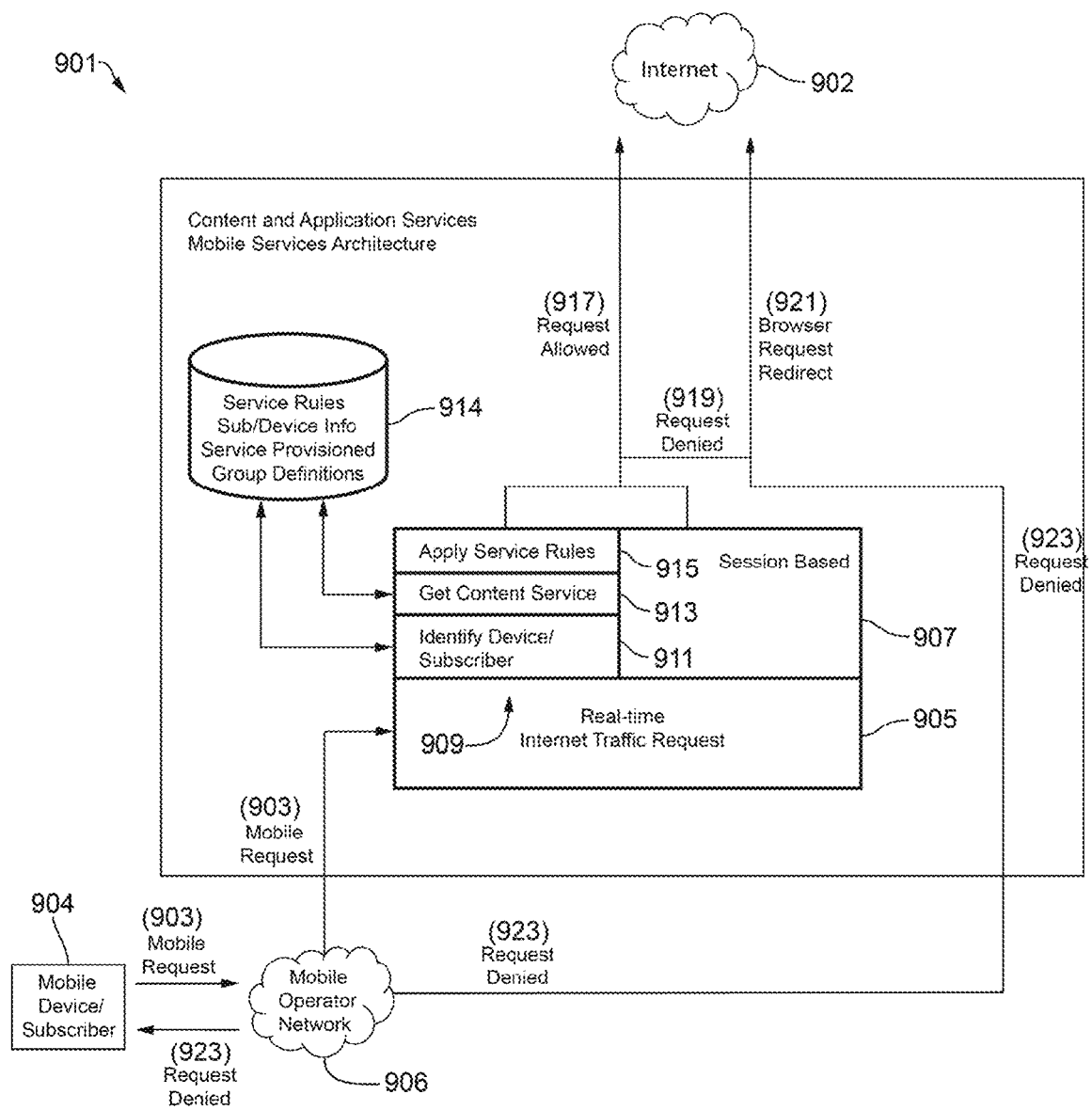
FIG. 16 is an illustration of an embodiment of a system architecture which may be utilized to provide content and applications for mobile services within the context of some of the restricted or metered bandwidth control paradigms of the types disclosed herein.

FIG. 16 depicts a particular, non-limiting embodiment of a system architecture 901 which may be utilized to provide content and applications for mobile services within the context of some of the restricted or metered bandwidth control paradigms of the types disclosed herein. As seen therein, when a mobile device/subscriber 904 requests access 903 to the Internet 902 over a modem, a determination is made 905 by the mobile virtual network operator 906 as to whether there is an active session 907 (based on time and data) that allows the mobile device/subscriber 904 to access the entire Internet 902. If the determination is made 909 that there is no active session (based on time and data), then the mobile device/subscriber 904 is validated or identified 911 and content services are provisioned 913. The content rules 914 for the provisioned services are then obtained and applied 915 to the request 903 for access. As part of this application, Internet access is restricted based on the content service definitions (e.g., filters are applied based on URLs, application types, IP address, protocol, or other such considerations).

As a result of the rules application, the request for access 903 is either allowed 917 or denied 919. In the case where the request for access 903 is denied 919 and it was a browser request, that request is redirected 921 to a designated website or portal, where the subscriber can choose content and application services or session offers, or manage their account. If the request is not browser-based, then a request denied notification 923 is sent to the mobile device/subscriber 904. It is to be noted that the rules have a hierarchy and can be applied to a subscriber, a group of subscribers, a company, a country, etc.

Figure 17:
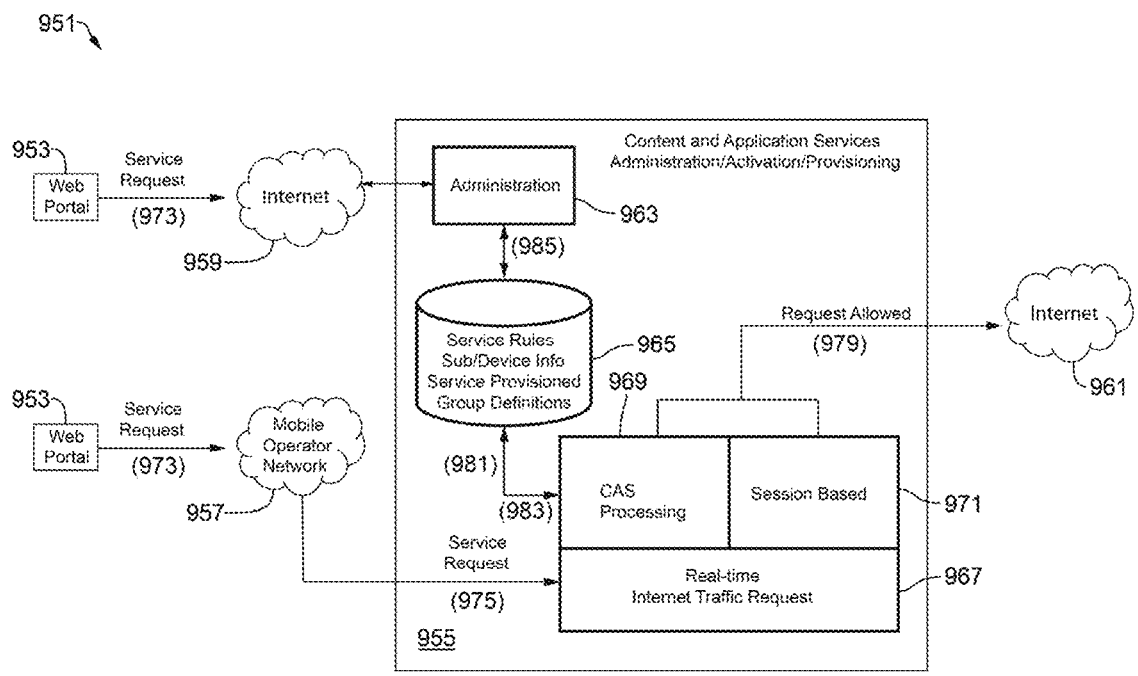
FIG. 17 is an illustration of an embodiment of a system architecture which may be utilized for administration, activation and provisioning of content and application services within the context of some of the restricted or metered bandwidth control paradigms of the types disclosed herein.

FIG. 17 depicts a particular, non-limiting embodiment of a system architecture 951 which may be utilized for administration, activation and provisioning of content and application services within the context of some of the restricted or metered bandwidth control paradigms of the types described herein. The system architecture 951 comprises a web portal 953 which accesses a service network 955 over a mobile network 957 (with or without an active session) or over the Internet 959. The service network 955 controls access to the Internet 961.

As seen therein, a subscriber or plan administrator for group plans uses a laptop, notebook or other mobile communications device to access the web portal 953 from which the subscriber or plan administrator creates a service request 973 involving a selection of content or application service. The web portal 953 may be accessed over the mobile network 957 (with or without an active session) or over the Internet 959. The service administration 963 provides updates and deletes rules as necessary and defines relevant groups/hierarchies 965. Notably, no changes are required to applications on the laptop, notebook or other mobile communications device being used by the subscriber/administrator, since any defined rules or policies are applied in the service network 955.

When a subscriber makes an Internet service request 973 via the Mobile Operator Network 957 it is processed as a real-time Internet traffic request 967. A check is done to determine if there is an active session for this subscriber. If there is an active session then session based 971 processing is performed and the request is granted access 979 on the Internet 961.

If there is no active session (based on time and data) that allows the device to access the entire Internet 961, then the selection is passed to CAS processing 969, where a request for service provisioning or activation 975 is made which specifies the service requested and the subscriber or device ID. If the request is granted 979, then the content or application service that was requested is permitted to be accessed on the Internet 961. In either case, over time, new services are created 983 with rules 965, and groups or hierarchies are defined.

As noted above, some of the systems and methodologies disclosed herein feature the concept of fractional applications, that is, mobile access which is restricted to a particular application or set of applications on a network (such as the Internet), as opposed to general access to the network. In some of these systems and methodologies, these fractional applications may be assembled into product catalogs, and the product catalogs may be combined with various service rules to provide a variety of service offerings.

Figure 18:
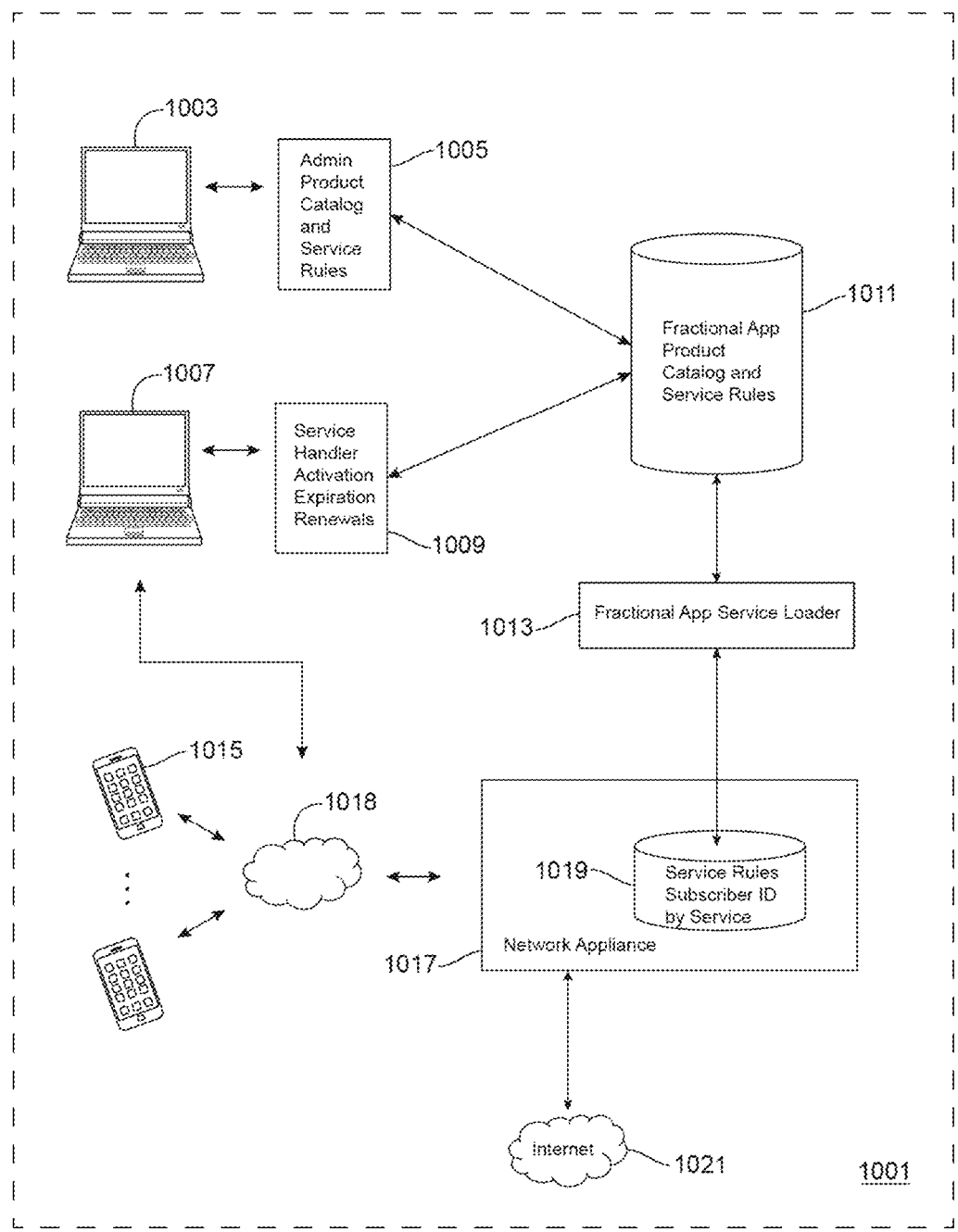
FIG. 18 is an illustration of an embodiment of a system for implementing fractional applications in accordance with the teachings herein.

FIG. 18 depicts a particular, non-limiting embodiment of the foregoing type of fractional application system 1001. As seen therein, this system may be utilized to provide end users 1007, 1015 on a first network 1018 with fractional access to applications (such as, for example, web sites or web-based products or services) on a second network 1021. In a preferred implementation, the first network 1018 may be, for example, a private network maintained by an MNO, and the second network 1021 may be, for example, a public network such as the Internet. In the system 1001 depicted, a first database 1011 is provided which maintains a fractional application product catalog and the associated service rules. The first database 1011 may store information such as the product ID of each application in the product catalog and associated information such as, for example, locational information (e.g., where the application is available), the duration over which the user is granted access to particular applications in the product catalog, and the price terms governing access to these products. The associated service rules may include such information as the service access/denial list (which may include, for example, URLs, IP addresses and protocols for which access to a given application is granted or denied), settlement rules, and service descriptions.

The first database 1011 may be modified by way of an administrator version 1005 of the product catalog and service rules, which is accessed by the system administrator 1003 through a suitable user interface (UI). The UI allows the system administrator 1003 to add new applications and service rules to the administrator version 1005 of the product catalog and service rules, and to delete, update or otherwise modify existing applications or service rules. Once these changes are committed, the first database 1011 is updated to reflect these changes.

A network appliance 1017 is provided in the first network 1018 which serves as a gateway to the second network 1021, and hence controls access to applications on the second network 1021 by the end users 1015 on the first network 1018. Such access is governed by internal rules maintained in a second database 1019. As updates are made to the first database 1011, the fractional application service loader 1013 propagates application and service rule information needed for access enforcement to the second database 1019.

The system 1001 is further equipped with a service handler 1009 which handles service activation, expiration and renewals. End users 1015 on the first network 1018 may access the service handler 1009 via a suitable UI or web interface to request activation of a fractional application or service, or renewal of an existing activated fractional application or service. The device 1007 used by the end user 1015 to access the service handler 1009 may be the same as, or different from, the device for which service activation or renewal is being requested. Although depicted as a laptop PC, this device 1007 may be any suitable device including, but not limited to, tablet PCs, desktop PCs, mobile communications devices, or mobile technology platforms.

The service handler 1009 verifies the application/service requests and, if allowed, updates the network appliance with the subscriber information of the requesting end user 1015 and the application or service allowed. Requests by the end users 1015 are either allowed or denied by the network appliance 1017, based on the internal service rules maintained in the second database 1019.

C3. Browser-Based Redirects

In some of the systems and methodologies disclosed herein, browser-based redirects may be utilized as part of the white label process. Hence, on the client side, a browser attempting to access a network may be redirected to a landing page utilizing a GSM or CDMA network. This is analogous to the situation in which browsers are redirected to a landing page on a Wi-Fi connection in a public establishment such as a hotel, where the user is then required to enter information in order to use the establishment's Wi-Fi network. In the present case, a similar experience is delivered over a GSM or CDMA modem instead of a Wi-Fi modem.

D1. Conclusion and Qualifiers

As used herein, the term "pipe" refers to a technique for passing information from one program process to another. Unlike other forms of interprocess communication (IPC), a pipe is one-way communication only. Basically, a pipe passes a parameter such as the output of one process to another process which accepts it as input. The system temporarily holds the piped information until it is read by the receiving process.

While the systems and methodologies disclosed herein have been frequently described or exemplified with reference to mobile communications devices in general, and mobile phones in particular, one skilled in the art will appreciate that these systems and methodologies are not necessarily limited to being used in conjunction with such devices, but instead have application to, or may be leveraged by, a wide variety of communications devices. Such communications devices include, but are not limited to, personal digital assistants (PDAs), mobile or cellular phones, portable e-book readers, notebooks, netbooks, laptops, personal computers (PCs), navigational systems, televisions, displays, and other such devices.

One skilled in the art will further appreciate that the systems and methodologies disclosed herein are not necessarily limited to any particular type of network or communications means or medium. Thus, for example, the systems and methodologies may be implemented over the Internet, wide-area networks (WANs), local area networks (LANs), intranets, and various combinations of the foregoing. These networks may be radio-based, hardwired, optical, and various combinations of the foregoing, and may operate over various frequencies of the electromagnetic spectrum.

One skilled in the art will also appreciate that the systems and methodologies disclosed herein are not necessarily limited to any particular type of business model, arrangement, or business. Thus, for example, while the systems and methodologies have been frequently described herein in reference to MNVEs, MNVOs, MNOs, and the like due in part to the current prevalence of these models, businesses and organizations, it will be appreciated that the systems and methodologies described herein may have broader applications and are not necessarily limited to these models, businesses and organizations.

One skilled in the art will also appreciate that the systems and methodologies disclosed herein are not necessarily limited to any particular protocol. Thus, while reference has been made herein to SDP, SIP, MLP and other such protocols, it will be appreciated that such protocols are subject to change, and that the systems and methodologies described herein may utilize or implement new or different protocols.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for controlling access to web-based applications available on a second network by a plurality of client mobile communications devices on a first network, wherein the first network is maintained by a service provider and includes (a) a first database comprising (i) a product catalog which contains a listing of a subset of the applications available on the second network, and (ii) a set of service rules which governs access to any of the applications in the product catalog by the client mobile communications devices through the service provider, (b) a second database which specifies the applications that have been activated for each of the plurality of client mobile communications devices, and (c) a network appliance which is in communication with the second database and which restricts access by each of the client mobile communications devices to the respective applications specified as active for that device, the method comprising:
receiving a request, from one of the plurality of client mobile communications devices, for an action selected from the group consisting of (a) activating an application, and (b) reactivating a previously activated application;
determining whether the request is allowable by (i) ascertaining whether the requested application is in the product catalog, and (ii) ascertaining whether the service rules permit the client device to access the requested application;
if the request is allowable, updating the second database to indicate that the application has been activated for the requesting client device; and
if the request is not allowable, sending a notice to the requesting client device that the request has been denied;
wherein the steps of receiving the request and determining whether the request is allowable are performed by the service provider, and wherein the service provider provides services to the client mobile communications devices in accordance with the set of service rules; wherein the product catalog and service rules in the first database are maintained by an administrator, and wherein the administrator makes periodic modifications to the product catalog and service rules in the first database.

2. The method of claim 1, wherein the first network is a private network maintained by an MNO (Mobile Network Operator), and wherein the second network is a public network.

3. The method of claim 2, wherein the second network is the Internet.

4. The method of claim 1, wherein the network appliance operates as a gateway to the second network.

5. The method of claim 1, further comprising:
receiving a request, from one of the plurality of client mobile communications devices, for access to an application on the second network;
if the application is specified as activated for the client mobile communications device, then allowing access to the application.

6. The method of claim 5, further comprising:
if the application is not specified as activated for the client mobile communications device, then denying access to the application.

7. The method of claim 1, wherein reactivating a previously activated application includes reactivating a previously activated application that has subsequently lapsed.

8. The method of claim 1, wherein the request is for activating an application.

9. The method of claim 1, wherein the second database includes a listing of applications from the product catalog, along with an indication of which of the applications have been activated for each of the plurality of client mobile communications devices, wherein the network appliance has associated therewith a service loader which is in communication with the first database, and wherein the service loader periodically updates the listing in the second database to reflect changes in the product catalog.

10. The method of claim 9, wherein the service loader updates the listing in the second database by adding to the listing any applications that have been added to the product catalog.

11. The method of claim 9, wherein the service loader updates the listing in the second database by deleting from the listing any applications that have been deleted from the product catalog.

12. The method of claim 1, wherein the set of service rules in the first database include information selected from the group consisting of (a) settlement rules, (b) access/denial lists, and (c) service descriptions.

13. The method of claim 12, wherein the set of service rules in the first database includes an access/denial list, wherein the access/denial list includes information describing applications or services to which access by the client mobile communications devices is granted or denied, and wherein the information is selected from the group consisting of URLs, IP addresses, and protocols.

14. The method of claim 12, wherein the set of service rules in the first database includes an access/denial list, and wherein the access/denial list includes location information which specifies locations from which access to the applications or services by the mobile communications devices will be permitted or denied.

15. The method of claim 12, wherein the set of service rules in the first database includes an access/denial list, and wherein the access/denial list includes duration information which specifies the duration over which access to the applications or services by the mobile communications devices will be permitted or denied.

16. The method of claim 1, wherein the first network further comprises an administrator version of the product catalog and service rules which is maintained by the network administrator of the first network, wherein the network administrator makes periodic modifications to the administrator version of the product catalog and service rules, and wherein, once these changes are committed, they are propagated to the first database.

17. The method of claim 1, wherein the first network further comprises a service handler which handles service activation, service expiration and service renewals for the plurality of client mobile communications devices, wherein the service handler further comprises a user interface, and wherein the user interface may be utilized to request activation of an application or service.

18. The method of claim 17, wherein the user interface may be utilized by the owner of a client mobile communications device to request activation of an application.

19. The method of claim 17, wherein the user interface may be utilized by an employee of an MVNE (Mobile Virtual Network Enabler) to request activation of an application or service.

20. A tangible, non-transient medium containing suitable programming instructions disposed in a tangible, non-transient medium which, when executed by a computer, cause the method of claim 1 to be carried out.

21. A method for controlling, by a service provider, access by a service provider to network-based applications which are available on a network, the method comprising:
providing access to the network to a plurality of subscribers of a service offered by the service provider, wherein the service is offered by the service provider in accordance with a service plan;
maintaining a product catalog which contains a subset of the applications available on the network;
maintaining a database which lists the activation state of applications in the product catalog for each of the plurality of subscribers, wherein each activation state listed in the database has a value selected from the group consisting of active and inactive;
changing, in the database, the activation state of an application in the product catalog for at least one of said plurality of subscribers; and
updating the database to reflect the change in activation state;
wherein any request to access an application in the product catalog which is received from a mobile communications device associated with one of said plurality of subscribers is denied if the activation state of the application is inactive for that subscriber, wherein the product catalog and service rules are maintained by an administrator, and wherein the administrator makes periodic modifications to the product catalog and service rules.

22. The method of claim 21, wherein the service provider is a wireless service provider, and wherein providing access to a network to a plurality of subscribers is in accordance with a wireless service plan.

23. The method of claim 21, wherein the set of service rules in the first database includes information describing applications or services to which access by the client mobile communications devices is granted or denied based on URLs.

24. The method of claim 21, wherein the set of service rules in the first database includes information describing applications or services to which access by the client mobile communications devices is granted or denied based on IP addresses.

25. The method of claim 21, wherein the set of service rules in the first database includes information describing applications or services to which access by the client mobile communications devices is granted or denied based on IP protocols.

26. The method of claim 21, wherein the set of service rules in the first database includes information describing applications or services to which access by the client mobile communications devices is granted or denied based on location.

27. The method of claim 21, wherein the set of service rules in the first database includes information describing applications or services to which access by the client mobile communications devices is granted or denied based on duration.

28. A tangible, non-transient medium containing suitable programming instructions which, when executed by a computer, cause the method of claim 21 to be carried out.

29. A method for controlling access to a network, comprising:
providing access to the network to a plurality of subscribers in accordance with a service plan;
maintaining a product catalog which contains a subset of the applications available on the network;
maintaining a database which lists the activation state of applications in the product catalog for each of the plurality of subscribers, wherein each activation state listed in the database has a value selected from the group consisting of active and inactive;
providing a set of service rules which governs access to any of the applications in the product catalog;
receiving a request, from a mobile communications device associated with one of said plurality of subscribers, to access an application in the product catalog;
determining whether the request is allowable by (i) ascertaining whether the activation state of the requested application has the value of active, and (ii) ascertaining whether the service plan permits the client device to access the requested application;
if the request is allowable, granting access to the requested application on the network; and
if the request is not allowable, sending a notice to said mobile communications device that the request for access has been denied;
wherein the product catalog and service rules are maintained by an administrator on the first network, and wherein the administrator makes periodic modifications to the product catalog and service rules.

30. The method of claim 29, wherein the service provider is a wireless service provider, and wherein providing access to a network to a plurality of subscribers is in accordance with a wireless service plan.

31. The method of claim 29, wherein the set of service rules in the first database includes information describing applications or services to which access by the client mobile communications devices is granted or denied based on URLs.

32. The method of claim 29, wherein the set of service rules in the first database includes information describing applications or services to which access by the client mobile communications devices is granted or denied based on IP addresses.

33. The method of claim 29, wherein the set of service rules in the first database includes information describing applications or services to which access by the client mobile communications devices is granted or denied based on IP protocols.

34. The method of claim 29, wherein the set of service rules in the first database includes information describing applications or services to which access by the client mobile communications devices is granted or denied based on location.

35. The method of claim 29, wherein the set of service rules in the first database includes information describing applications or services to which access by the client mobile communications devices is granted or denied based on duration.

36. A tangible, non-transient medium containing suitable programming instructions which, when executed by a computer, cause the method of claim 29 to be carried out.

* * * * *